(12) United States Patent
Tagawa

(10) Patent No.: US 8,938,150 B2
(45) Date of Patent: Jan. 20, 2015

(54) RECORDING APPARATUS

(75) Inventor: Yojiro Tagawa, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 13/032,702

(22) Filed: Feb. 23, 2011

(65) Prior Publication Data

US 2011/0142412 A1 Jun. 16, 2011

Related U.S. Application Data

(63) Continuation of application No. 11/423,211, filed on Jun. 9, 2006, now Pat. No. 7,920,775.

(30) Foreign Application Priority Data

Jun. 16, 2005 (JP) .................................. 2005-176872

(51) Int. Cl.
| H04N 5/775 | (2006.01) |
| H04N 5/783 | (2006.01) |
| H04N 5/77 | (2006.01) |
| H04N 9/804 | (2006.01) |
| H04N 9/82 | (2006.01) |

(52) U.S. Cl.
CPC .............. *H04N 5/783* (2013.01); *H04N 5/772* (2013.01); *H04N 9/8042* (2013.01); *H04N 9/8211* (2013.01)
USPC ....................................................... 386/230

(58) Field of Classification Search
CPC ............. H04N 5/00; H04N 7/00; H04N 9/00; H04N 5/232; H04N 5/23245; H04N 5/783
USPC ......................................... 386/224, 328, 230
See application file for complete search history.

(56) References Cited

U.S. PATENT DOCUMENTS

| 5,640,202 A | 6/1997 | Kondo et al. |
| 6,192,188 B1 | 2/2001 | Dierke |
| 6,529,683 B2 | 3/2003 | Mori et al. |
| 6,710,785 B1 * | 3/2004 | Asai et al. ...................... 715/723 |

(Continued)

FOREIGN PATENT DOCUMENTS

| JP | 7-298112 A | 11/1995 |
| JP | 2003-219412 | * 7/2003 |

(Continued)

OTHER PUBLICATIONS

Jan. 5, 2010 Japanese Official Action in Japanese Patent Appln. No. 2005-176872.

*Primary Examiner* — Huy T Nguyen
(74) *Attorney, Agent, or Firm* — Fitzpatrick, Cella, Harper & Scinto

(57) ABSTRACT

A recording apparatus has: a stream generating unit for generating a first stream constituted of a first moving image signal at a first frame rate and an input audio signal and a second stream constituted of a second moving image signal at a second frame rate faster than the first frame rate and a predetermined audio signal; a recording unit for recording the first and second streams; and an instructing unit for instructing a change-over of a frame rate, wherein in accordance with an instruction output from the instructing unit during recording the first stream, the stream generating unit outputs the second stream instead of the first stream, and the recording unit records the second stream output in response to the instruction by the instructing unit, instead of the first stream.

36 Claims, 24 Drawing Sheets

(56) References Cited

U.S. PATENT DOCUMENTS

| | | |
|---|---|---|
| 7,110,025 B1 | 9/2006 | Loui et al. |
| 2004/0008767 A1 | 1/2004 | Ueda et al. |
| 2005/0002283 A1* | 1/2005 | Suzuki ..................... 369/30.08 |
| 2005/0052553 A1 | 3/2005 | Kido et al. |
| 2006/0238620 A1 | 10/2006 | Asada et al. |

FOREIGN PATENT DOCUMENTS

| | | |
|---|---|---|
| JP | 2004-221999 A | 8/2004 |
| JP | 2005-136754 A | 5/2005 |

* cited by examiner

FIG. 6

```
typedef struct _SUPER_INDEXENTRY {
    LONG  address;
    LONG  size;
    INT   framePerSec;
    INT   StartFrame;
    INT   nFrame;
} SUPER_INDEXENTRY;
```

FIG. 7

| SuperH_INDEXENTRY (ATTRIBUTE INFORMATION OF idxH OF D5) |
|---|
| SuperH6INDEXENTRY (ATTRIBUTE INFORMATION OF idxH OF D7) |

FIG. 12

```
typedef struct _VIDEO_FRAME {
    INT  address;
    INT  size;
    INT  msec;
    INT  frameNumber;
} VIDEO_FRAME;

VIDEO_FRAME VideoFrameRingContainer [1000];
    INT  WritePonter;
    INT  ReadPointer;
``` idx1 INDEX BUFFER

| ENTRY OF video0 |
| --- |
| ENTRY OF video3 |
| ENTRY OF video6 |
| ENTRY OF video9 |
| ENTRY OF video12 |
| ENTRY OF video15 |
| ENTRY OF video18 |
| ENTRY OF video21 |
| ENTRY OF video24 |
| ENTRY OF video27 |
| ENTRY OF video30 |
| ENTRY OF video33 |
| ENTRY OF video36 |

RECORDING APPARATUS

This application is a continuation of application Ser. No. 11/423,211 filed Jun. 9, 2006.

BACKGROUND OF THE INVENTION

1. Field of the Invention

The present invention relates to a recording apparatus, and more particularly to an apparatus capable of recording video data having different frame rates.

2. Related Background Art

A digital camera has been known conventionally which records video signals on a memory card or the like. The digital camera of this type often uses a CCD sensor or a MOS sensor as an image capture element. The CMOS sensor has advantages over the CCD sensor in that a consumption current is smaller and a data read speed is higher. By utilizing these advantages, it becomes possible nowadays to capture moving image signals at a high frame rate by driving a CMOS sensor at high speed.

Japanese Patent Application Laid-Open No. H07-298112 (corresponding foreign application: U.S. Pat. No. 5,640,202) describes a moving image capture system capable of making variable a frame rate of an image capture apparatus constituted of an image capture element, A/D conversion means, a signal processing unit and image signal compressing unit.

A digital camera writes captured moving image data on a recording medium in accordance with an audio video interleaved (AVI) scheme. A frame rate of moving image data is generally faster than a data write rate of a recording medium. Therefore, moving image data rate is lowered by utilizing various image compression technologies, and a write timing of a recording medium is adjusted by using a buffer memory.

There are needs of a long time image capture and a high speed frame rate.

As the moving image data frame rate (the number of frames per unit time) becomes high, the moving image data rate becomes high. Since a buffer may overflow, a single image capture time is limited by the capacity of a buffer.

If the moving image frame rate is low and if it is lower than an allowable data write rate of a recording medium, the single image capture time is limited by the capacity of a recording medium.

It is therefore difficult to satisfy both a long time image capture and a high speed frame rate.

A scene with a high speed object such as a sports event is desired in some cases to capture moving images at a high speed frame rate.

However, a presently available recording format of moving image data cannot change a moving image data frame rate intermediately during image capture.

Even if moving image data is recorded by changing a moving image data frame rate intermediately during image capture, the moving image data is reproduced at one of frame rates.

Therefore, a low speed frame rate section is reproduced at a normal speed, whereas a high speed frame rate section is reproduced at a slow motion speed.

Changing a frame rate during image capture has been impossible essentially because the images cannot be reproduced as desired.

SUMMARY OF THE INVENTION

It is an aspect of the invention to solve the above-described problems.

It is another aspect of the invention to allow essentially a frame rate to be changed during image capture.

In order to achieve these objects, according to an embodiment of the present invention, a recording apparatus comprises: image input means for inputting a moving image signal; audio input means for inputting an audio signal; image generating means for generating a first moving image signal at a first frame rate and a second moving image signal at a second frame rate faster than the first frame rate, by using the moving, image signal input by the input means; stream generating means for generating a first stream constituted of the first moving image signal and the audio signal input by the audio input means and a second stream constituted of the second moving image signal and a predetermined audio signal; recording means for recording the first and second streams output from the stream generating means on a recording medium; and instructing means for instructing a change-over of a frame rate, wherein in accordance with an instruction output from the instructing means during recording the first stream, the stream generating means outputs the second stream instead of the first stream, and the recording means records the second stream output in response to the instruction by the instructing means, instead of the first stream.

BRIEF DESCRIPTION OF THE DRAWINGS

FIG. 6 is a diagram showing the structure of a SUPER_INDEXENTRY structure.

FIG. 7 is a diagram showing a layout of data of a SUPER_INDEXENTRY type.

FIG. 12 is a diagram showing attribute information of each frame of a video buffer.

DESCRIPTION OF THE PREFERRED EMBODIMENTS

Exemplary embodiments of the present invention will be described in detail with reference to the accompanying drawings.

Figure 1:
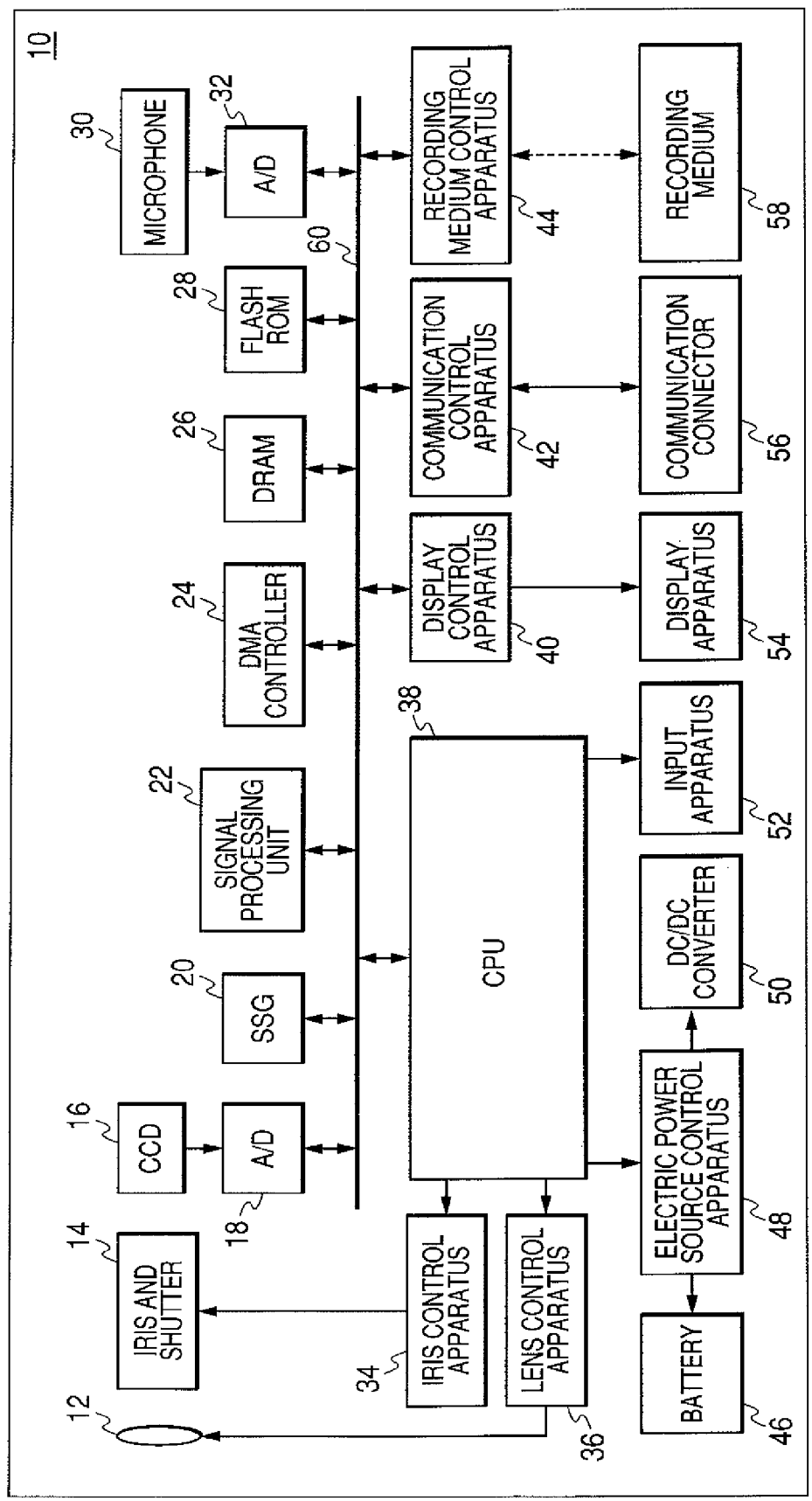
FIG. 1 is a block diagram showing an outline of the structure of a digital camera according to a first embodiment of the invention.

FIG. 1 is a block diagram showing an outline of the structure of a digital camera according to the first embodiment of the invention. In FIG. 1, a digital camera 10 is constituted of a lens unit 12, an iris and shutter mechanism 14, a CCD image capture element 16, an A/D converter 18, an SSG unit 20, a signal processing unit 22, a DMA controller 24, a DRAM 26, a flash ROM 28, a microphone 30, an A/D converter 32, an iris control apparatus 34, a lens control apparatus 36, a CPU 38, a display control apparatus 40, a communication control apparatus 42, a recording medium control apparatus 44, a battery 46 as an electric power source, an electric power source control apparatus 48, a DC/DC converter 50, an input apparatus 52, a display apparatus 54, a communication connector 56, a recording medium 58, a system bus 60 and the like.

The CCD image capture element 16 converts an optical image taken with the lens unit 12 and the iris and shutter mechanism 14 into an electric signal. The A/D converter 18 converts an analog electric signal output from the CCD image capture element 16 into a digital signal. The SSG unit 20 supplies a sync signal to the CCD image capture element 16 and A/D converter 18. The signal processing unit 22 performs image processing such as compression and expansion. The DMA controller 24 realizes high speed data transfer between predetermined sections via the system bus 60. DRAM 26 is a main storage for the digital camera 10, and is used also as a buffer memory during, image capture. The flash ROM 28 stores firmware programs.

The microphone 30 converts sounds and voices externally input to the digital camera 10 into an electric signal. The A/D converter 32 converts an analog audio signal output from the microphone 30 into a digital signal. The iris, control apparatus 34 controls the iris and shutter mechanism 14. The lens control apparatus 36 drives the lens unit 12 for AF (auto focus), zoom and the like. CPU 38 controls the entirety of the digital camera 10 in accordance with the firmware programs loaded from the flash ROM 28.

The display control apparatus 40 controls the display apparatus 54 made of TFT liquid crystal or the like. The communication control apparatus 42 controls communications using a USB protocol. The communication connector 56 connects an external PC, printer or the like via a USB cable. The recording medium control apparatus 44 reads/writes data from/into the recording medium 58 such as a solid state memory card, a hard disk and an optical disk.

The electric power control apparatus 48 controls the DC/DC converter 50 to detect a remaining capacity of the battery 46. The DC/DC converter 50 converts an electric power of the battery 46 into a proper voltage and supplies the voltage to each portion of the digital camera 10.

The input apparatus 52 is used by a user for entering various instructions and selections in accordance with a menu screen displayed on the display apparatus 54. The input apparatus 52 is constituted of a keypad, a zoom lever, an electric power switch, a release switch and the like. The system bus 60 realizes high speed data transfer among circuit blocks.

Description of AVI and RIFF

A file format to be used in the embodiments will be described.

An AVI file is formed by using a file format called an RIFF (Resource Interchange File Format) format. The RIFF format is used for collecting various resources in one file. Namely, the RIFF format can process files of various types without changing the fundamental structure, even if new formats are added.

A file format of the RIFF is constituted of a block called a chunk as one unit. The chunk is constituted of an identifier of four bytes, size information of four bytes and a data portion of an arbitrary size. The identifier is disposed being right aligned, and spaces are filled in the remaining portion, if the identifier is made of three characters or shorter. The structure of the data portion changes with the type of the chunk.

A particular chunk may contain a chunk. In this case, the chunks have a so-called parent-child relation. A chunk containing a chunk is called a parent chunk, and a chunk contained in a chunk is called a sub chunk. One chunk may contain a plurality of sub chunks.

Figure 2A:
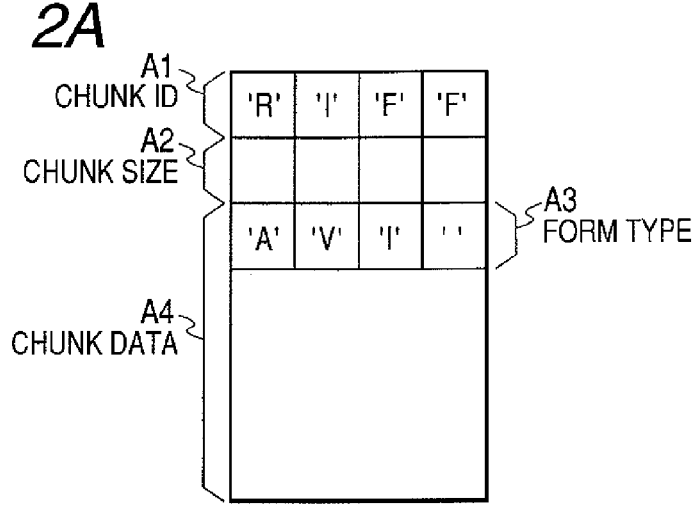
FIGS. 2A, 2B and 2C are schematic diagrams showing chunks.

An RIFF chunk indicated by an identifier RIFF is a particular chunk which is disposed at the top of an RIFF file. A LIST chunk indicated by an identifier LIST has sub chunks listed. FIG. 2A shows the structure of an RIFF chunk, FIG. 2B shows the structure of a LIST chunk and FIG. 2C shows the structure of a general chunk such as an strh chunk.

As shown in FIG. 2A, an RIFF chunk has a character string "RIFF" as a chunk ID (identifier) in first four bytes (A1). The next four bytes (A2) have a chunk size indicating a byte length of a following data portion (A4). The first four bytes (A3) of the data portion (A4) load a form type indicating the file format of data to be stored in the RIFF file. For example, in the case of AVI data, a character string "AVI" is loaded in the form type A3.

Figure 2B:
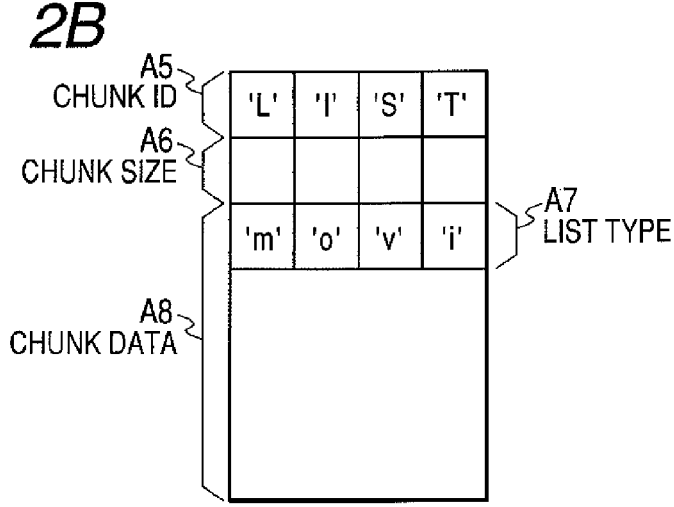

As shown in FIG. 2B, a LIST chunk has a character string "LIST" as a chunk ID in first four bytes (A5). The next four bytes (A6) have a chunk size indicating a byte length of a following data portion (A8). The first four bytes (A7) of the data portion (A8) load a list type indicating the meaning or type of the LIST chunk. In the example shown in FIG. 2B, a character string "movi" is loaded as the list type. The LIST chunk may contain an ICOP chunk indicating a copyright and an ICRD chunk indicating a creation date.

Figure 2C:
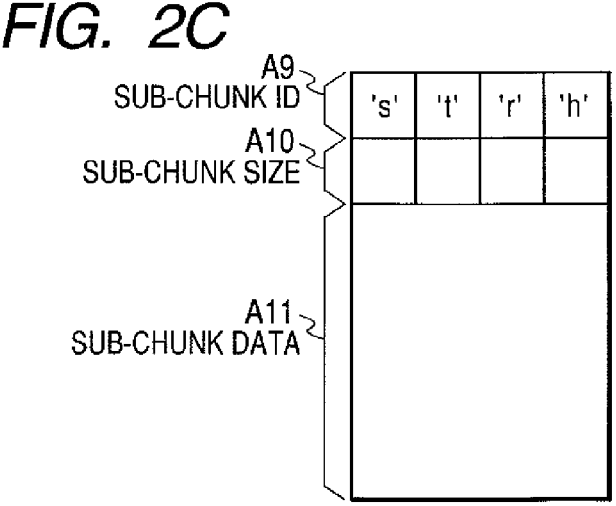

As shown in FIG. 2C; a general chunk has a chunk ID (in the example shown in FIG. 2C, a character string "strh") as a chunk ID in first four bytes (A9). The next four bytes (A10) have a chunk size indicating a byte length of a following data portion (A11).

AVI File of RIFF Format

Figure 3:
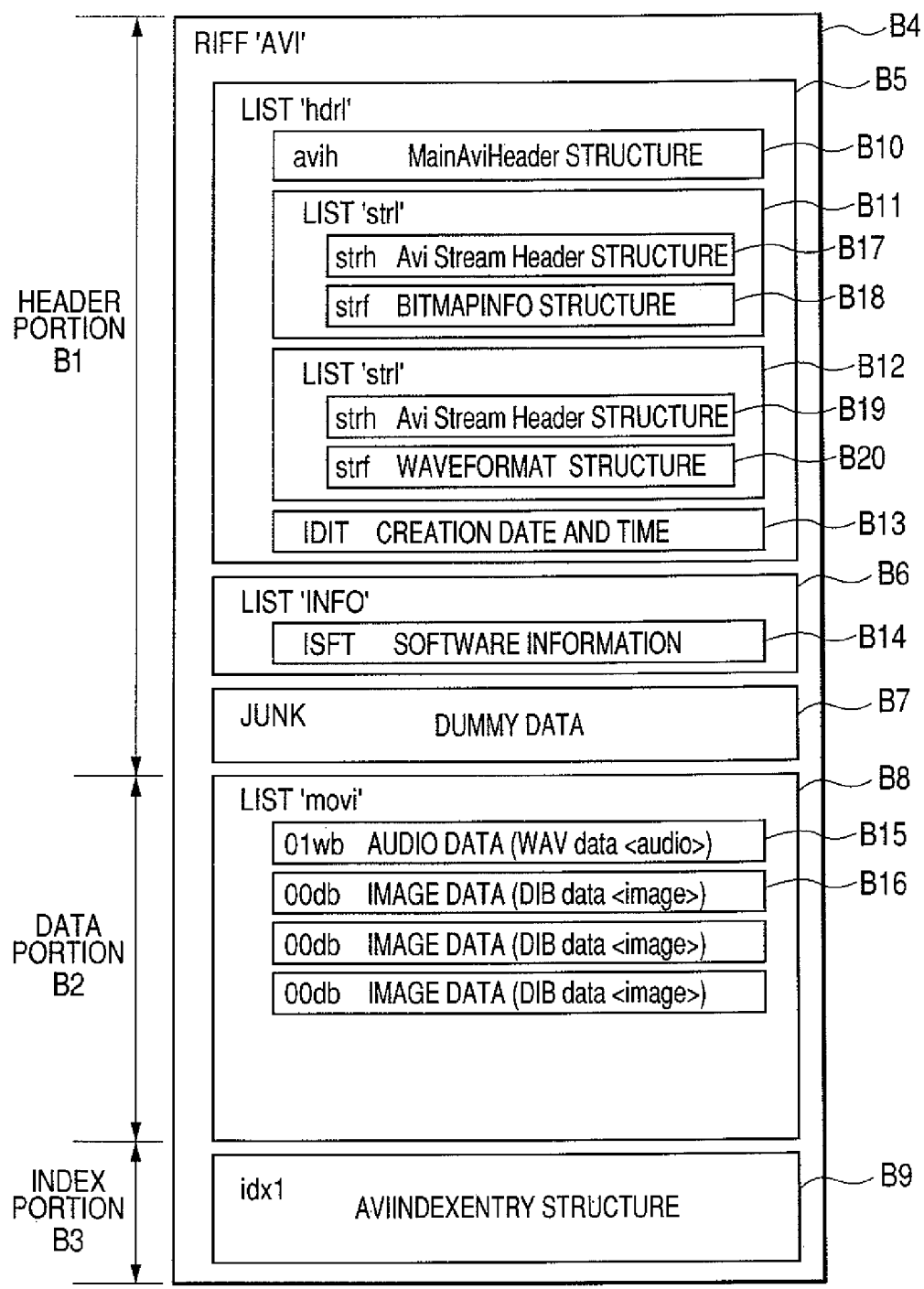
FIG. 3 is a schematic diagram showing an AVI file of an RIFF scheme.

FIG. 3 shows the structure of an AVI file of the RIFF format. A header portion B1 stores therein data regarding attribute information of the AVI file. A data portion B2 stores therein actual audio and video data of the AVI file. An index field B3 stores therein an offset position and size of each file of the audio and video data recorded in the data portion B2.

A form type of the RIFF chunk B4 is "AVI". A chunk data portion of the RIFF chunk B4 is constituted of a LIST chunk B5, a LIST chunk B6, sub chunk B7, a LIST chunk B8, and a sub chunk B9. A list type of the LIST chunk B5 is "hdrl", and a list type of the LIST chunk B6 is "INFO". A chunk ID of the sub chunk B7 is "JUNK", and dummy data is loaded in the chunk data portion. A list type of the LIST chunk B8 is "movi" and a chunk ID of the sub chunk B9 is "idxl".

The sub chunk B7 can adjust the size of the header portion B1 by filling dummy data in the chunk data portion. In other words by using a JUNK chunk for accommodating a proper amount of data, the length or size of the header portion B1 can be adjusted.

A chunk data portion of the LIST chunk B5 is constituted of a sub chunk B10, a LIST chunk B11, a LIST chunk B12 and a sub chunk B13. A chunk ID of the sub chunk B10 is "avih", and a list type of the LIST chunk B11 is "strl". A list type of the LIST chunk B12 is also "strl", and a chunk ID of the sub chunk B13 is "IDIT". The sub chunk B13 stores therein creation date information in the chunk data portion.

A chunk data portion of the LIST chunk B6 has a chunk ID of "ISFT" and is constituted of a sub chunk B14 having software information. A chunk data portion of the LIST chunk B8 is constituted of a sub chunk B15, a sub chunk B16 and the like. A chunk ID of the sub chunk B15 is "01wb", and has audio data in the chunk data portion. A chunk ID of the sub chunk B16 is "00 db", and has video data in the chunk data portion. The sub chunk B15 and sub chunk B16 exist repetitively in correspondence with the number of recorded frames.

A chunk data portion of the LIST chunk B11 is constituted of a sub chunk B17 and a sub chunk B18. A chunk ID of the sub chunk B17 is "strh", and has an AviStreamHeader structure in the chunk data portion. A chunk ID of the sub chunk B18 is "strf", and has a BITMAPINFO structure in the chunk-data portion.

A chunk data portion of the LIST chunk B12 is constituted of a sub chunk B19 and a sub chunk B20. A chunk ID of the sub chunk B19 is "strh", and has an AviStreamHeader structure in the chunk data portion. A chunk ID of the sub chunk B20 is "strf", and has a WAVEFORMAT structure in the chunk data portion.

Moving images can be reproduced by sequentially reading audio and video data in the sub chunks B15, B16, . . . contained in the chunk data portions of the LIST chunk B8. Namely, when reproduction of an AVI file starts, the sub chunk B15 containing audio data and the sub chunk B16 containing video data are first read.

Data Portion and Index Portion

Figure 4:
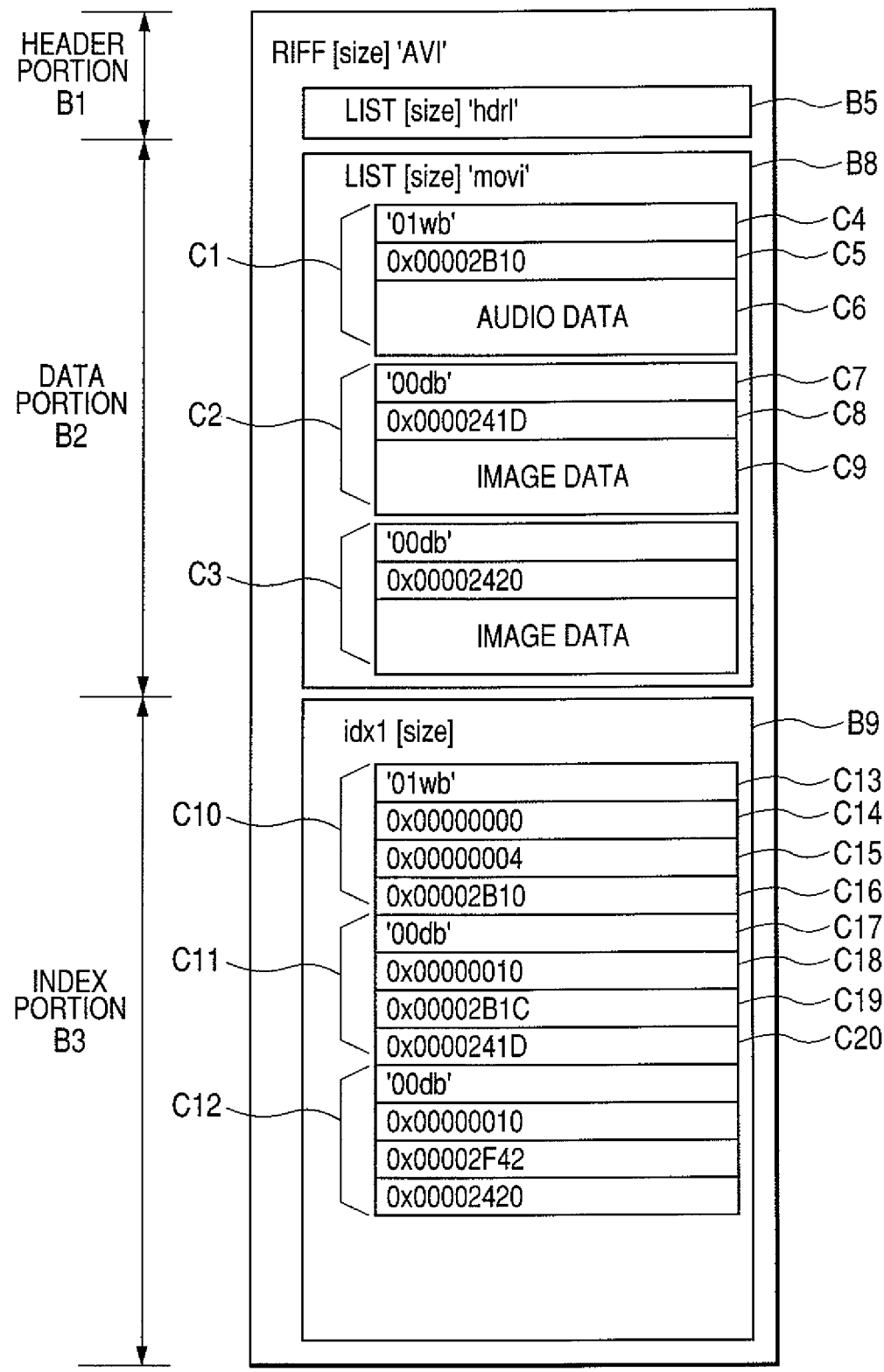
FIG. 4 is a schematic diagram showing the details of a data portion and an index portion.

FIG. 4 shows the details of the data portion B2 and index portion B3 shown in FIG. 3. Namely, FIG. 4 is a diagram showing the detailed structure of the LIST chunk 88 and sub chunk B9.

A sub chunk C1 stores audio data. A sub chunk C2 stores video data. A sub chunk C3 stores video data following the sub chunk C2. A chunk ID (C4) of the sub chunk C1 is "01wb", and the following four bytes (C5) store a byte length of a chunk data portion (C6) of the sub chunk C1. The chunk data portion (C6) stores audio data. A chunk. ID (C7) of the sub chunk C2 is "00 db", and the following four bytes (C8) store a byte length of a chunk data portion (C9) of the sub chunk C2. The chunk data portion (C9) stores video data.

Array data of an AVIINDEXENTRY structure is stored in the chunk data portion of the idxl sub chunk B9. C10 denotes a first entry, C11 denotes a second entry and C12 denotes a third entry. The sub chunks C1, C2 and C3 of the LIST chunk B8 are in one-to-one correspondence with the entries C10, C11 and C12.

Each entry of the AVIINDEXENTRY structure is constituted of an ID, a flag, an offset from the top of the chunk data in the LIST chunk, and a size of the sub chunk data. The entries C10, C11 and C12 store various information of the sub chunk C1, sub chunk C2, and sub chunk C3, respectively, the information being used when the AVI file is reproduced.

The entry C10 corresponding to the sub chunk C1 has in a portion C13 the same character string "01wb" as the chunk ID (C4) of the sub chunk C1, as ID, and has "0x00000000" representative of audio data in a portion C14, as a flag. An offset from the top of the chunk data of the sub chunk C1 is held in a portion C15, and a byte length of the sub chunk C1 is held in a portion C16.

The entry C11 corresponding to the sub chunk C2 has in a portion C17 the same character string "00dc" as the chunk ID (C7) of the sub chunk C2, as ID, and has "0x00000010" representative of video data in a portion C18, as a flag. An offset from the top of the chunk data of the sub chunk C2 is held in a portion C19, and a byte length of the sub chunk C2 is held in a portion C20.

Audio and video data in the portion of the LIST chunk B8 can be accessed smoothly and reproduced efficiently, by utilizing the AVIINDEXENTRY structure of the entries C10 to C12 and the like when the AVI file is reproduced.

Example of File Structure

Figure 5:
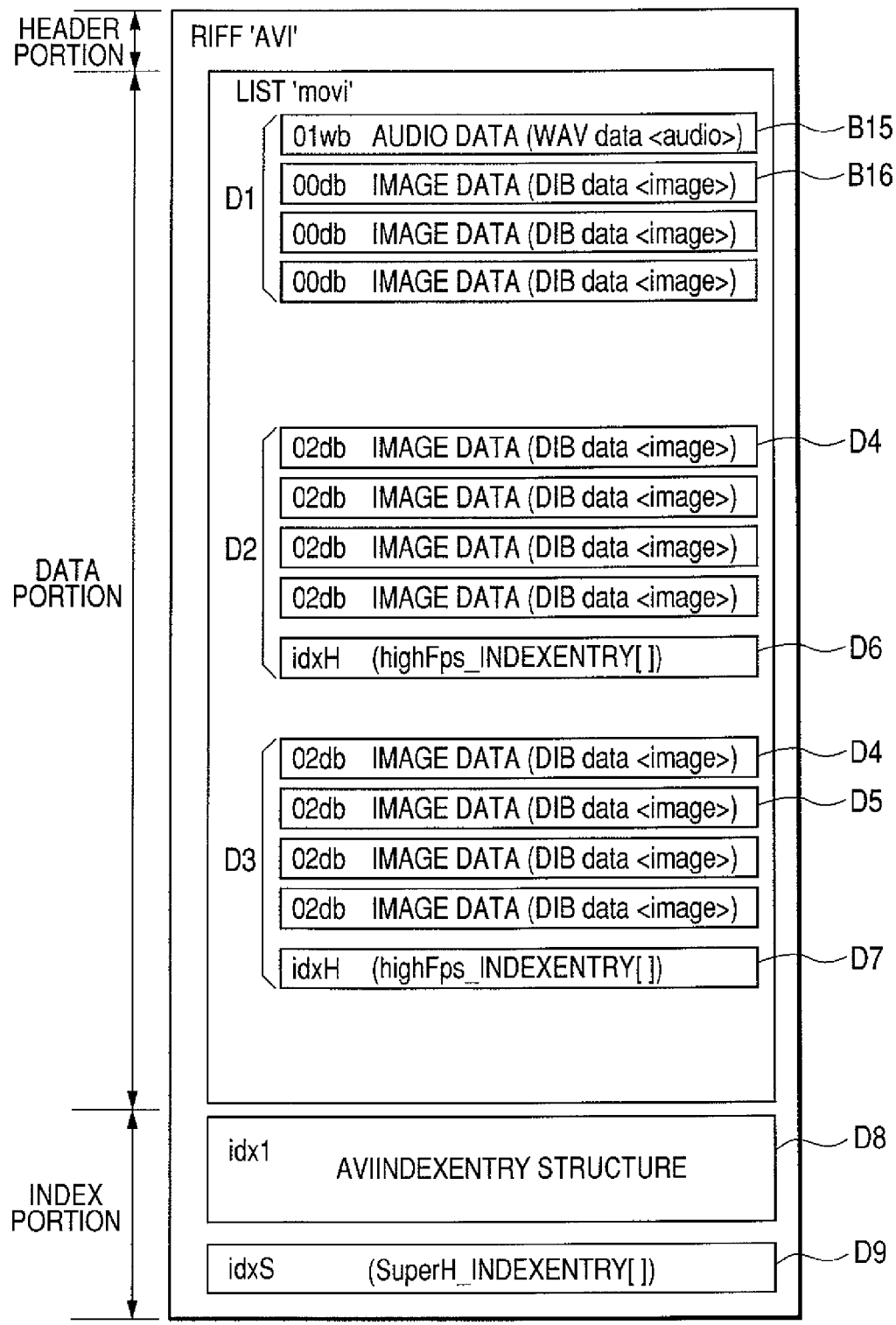
FIG. 5 is a schematic diagram showing an example of the structure of an AVI file of the RIFF scheme when a frame rate is changed intermediately during recording.

FIG. 5 shows an example of the structure of an AVI file of the RIFF format when a frame rate is changed intermediately during recording, according to the embodiment. Different points from those shown in FIG. 3 will be described mainly.

After a section D1 during which audio and video data is captured at a normal frame rate, sections D2 and D3 follow during which audio and video data is captured at a high speed frame rate.

Sub chunks D4 and D5 of the sections D2 and D3 hold video data captured at the high speed frame rate. In order to distinguish from video data captured at the normal frame rate, the chunk ID of the sub chunk D4 has a specific value "02 db", and this sub chunk is neglected when the normal AVI file is reproduced. In this example, the sub chunk D5 is also used for reproducing the normal AVI file. The chunk ID of this sub chunk has the same ID (="00db") as that of video data captured at the normal frame rate. The sub chunk D5 is reproduced even during reproduction of video data captured at the normal frame rate.

As shown in FIG. 5, in this embodiment, one file can have a plurality of sections D2 and D3 for holding video data captured at the high speed frame rate.

An idxH sub chunk D6 stores index information of frame data in the section D2 capturing at the high speed frame rate. Similarly, an idxH sub chunk D7 stores index information of frame data in the section D3 capturing at the high speed frame rate. The chunk data portion of the idxH sub channel D7 is constituted of array data of the AVIINDEXENTRY structure, similar to the index entry of the idxl index chunk used by a normal AVI file.

An idxS sub chunk D8 manages attribute information of the idxH sub chunks. An idxS sub chunk D9 holds array data of a SuperH_INDEXENTRY structure. FIG. 6-S*hows* an example of the SuperH_INDEXENTRY structure. A variable "address" indicates a start address of the idxH index indicated by the entry. A variable "size" indicates a size of the idxH index indicated by the entry. A variable "framePerSec" indicates a frame rate of the section indicated by the idxH index indicated by the entry. A variable "StartFrame" indicates a frame number of the top frame of the section indicated by the idxH index indicated by the entry. A variable "nFrame" indicates a frame number of the section indicated by the idxH index indicated by the entry. For example, in the example shown in FIG. 5, since two idxH sub chunks are used, the data portion of the idxS sub chunk has two SUPER_INDEXENTRY structures holding attribute information of the idxH sub chunks D6 and D7, as shown in FIG. 7.

Moving Image Sequence

Figure 8:
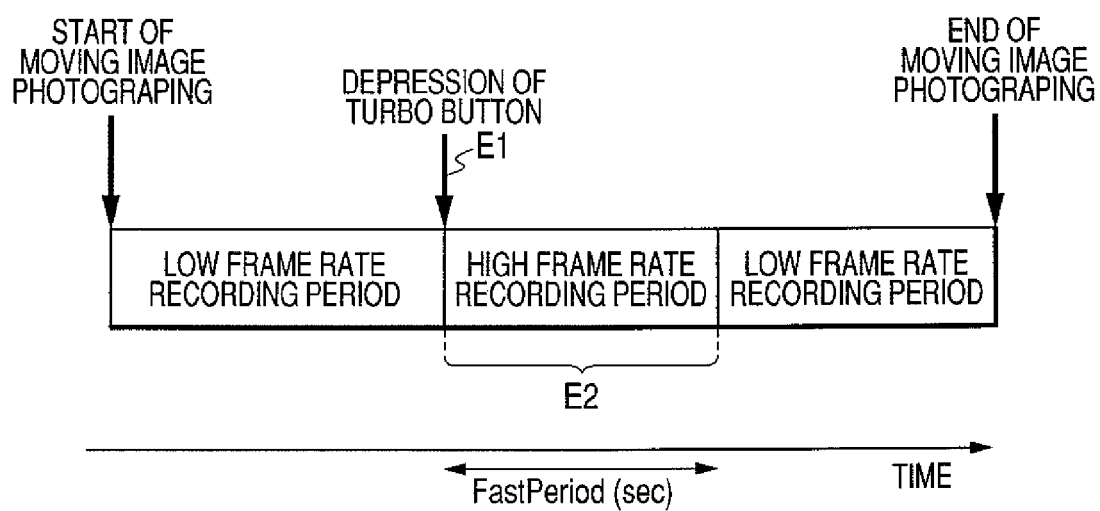
FIG. 8 is a schematic diagram showing an example of a change in a frame rate of moving image recording.

Next, a recording operation of the embodiment will be described with reference to FIGS. 8 to 10. In this embodiment, after a first key is operated, e.g., a turbo button is depressed, while moving image data is captured at a predetermined frame rate (a first frame rate: n1 frames/sec (n1 is an integer of 1 or larger)), moving image data is captured in a predetermined period after the button depression, at a frame rate faster than a predetermined frame rate (a second frame rate: n2 frames/sec (n2 is an integer larger than n1)). FIG. 8 is a schematic diagram illustrating a change in a frame rate of moving image data to be recorded when the turbo button is depressed.

A period (E2) designated in seconds by FastPeriod after the time (E1) when the turbo button is depressed, is a period while moving image data is captured at a higher frame rate than that during the periods before and after the button depression time. In this embodiment, a series of moving image photographing processes is realized by cooperations of a plurality of tasks running on a real time OS operating on CPU 38.

Task Configuration Diagram

Figure 9:
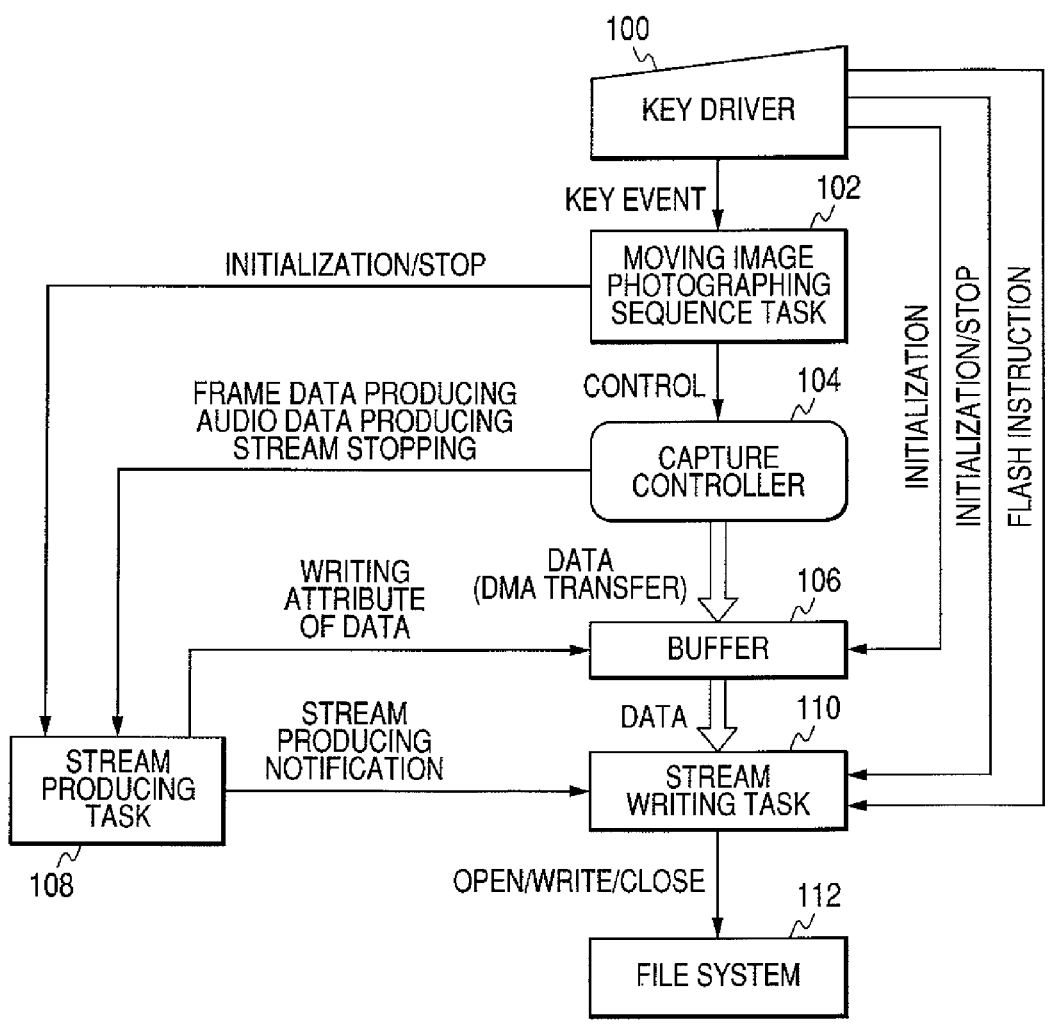
FIG. 9 is a schematic diagram showing the module structure of software for performing a series of moving image photographing processes of the embodiment.
Figure 10:
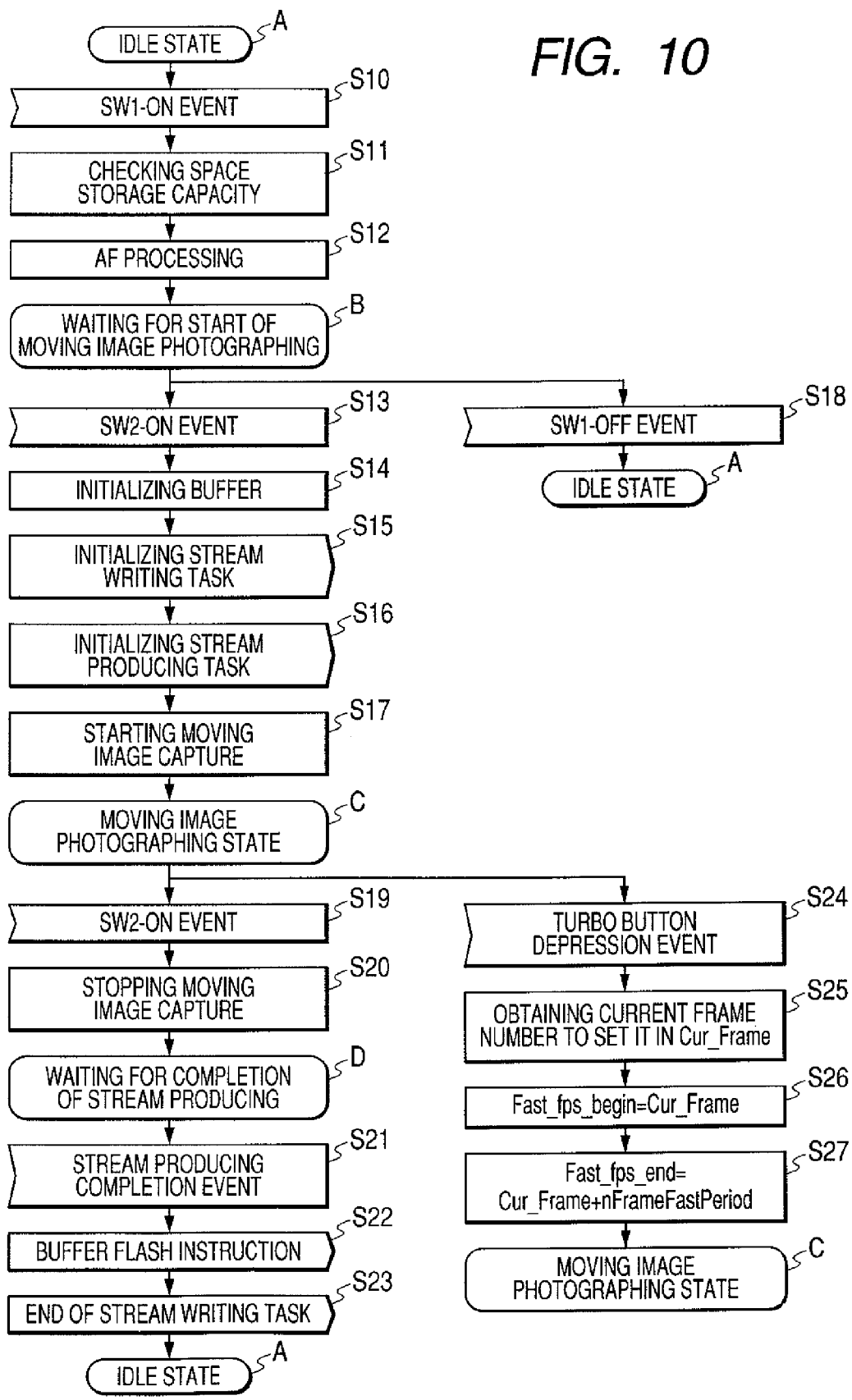
FIG. 10 is a flow chart illustrating a moving image photographing sequence according to the first embodiment.

FIG. 9 is a schematic diagram showing the module structure of software for performing a series of moving image photographing processes of the embodiment.

When an operation member such as an unrepresented switch and a button of the input apparatus 52 is operated, a key driver 100 issues a key event. In response to the key event from the key driver 100, a moving image photographing sequence task 102 conducts moving image photographing start and stop, setting a high speed frame rate recording and the like.

In order to capture moving images, a capture controller 104 controls circuit blocks including the CCD image capture element 16, A/D converter 18, SSG unit 20, signal processing unit 22, DMA controller 24, microphone 30, A/D converter 32 and the like. Under this control, the capture controller 104 produces moving image stream data constituted of video data in the frame unit and audio data per unit time. In this embodiment, CCD 16 outputs moving image data of 90 frames/sec.

A buffer 106 temporarily stores moving image stream data produced by the capture controller 104 and management information for the moving image stream data. More specifically, the buffer 106 has: a video buffer for temporarily storing video data in the frame unit; an audio buffer for temporarily storing audio data per unit time; an audio chunk buffer to be used for writing audio data in the audio chunk; an idxl index buffer, an idxH index buffer and an idxS index buffer respectively for storing index information. A portion of DRAM 26 is used as the buffer 106. For data transfer from the capture controller 104 to buffer 106, a DMA controller 24 executes DMA transfer to DRAM 26 from the signal processing apparatus 22 via the system bus 60.

A stream producing task 108 monitors a moving image stream data producing event and a moving image stream stop event of the capture controller 104. A stream writing task 110 executes open/close of an AVI file, AVI header write, stream data write, and index write, relative to a file system 112 in the recording medium 58.

Moving Image Photographing Sequence Task

Next, the operation of the moving image photographing task will be described. FIG. 10 is a flow chart illustrating the operation of the moving image photographing sequence task.

The moving image photographing sequence task has four states: (A) an idle state; (B) a moving image photographing start wait state; (C) a moving image photographing state; and (D) a state for waiting for stream producing completion.

In the idle state (A), upon reception of a SW1-on event from the key driver 100 (S10), a storage space capacity of the recording medium 58 for storing a moving image, file is checked (S11). If a sufficient storage space capacity can be retained, an AF (auto focus) process is executed (S12). After the AF process, the state transits to the moving image photographing start wait state (B). The moving image photographing start wait state (B) receives a SW2-on event (S13) and a SW1-off event (S18).

In the moving image photographing start wait state (B), upon reception of the SW2-on event from the key driver 100 (S13), the buffer 106 is initialized (S14), and an initializing request event is transmitted to the stream writing task 110 (S15). An initialization request event is transmitted to a stream producing task 108 (S16). A moving image capture start is instructed to the capture controller 104 (S17) to thereafter transit to the moving image photographing state (C). If the WS1-off event is received in the moving image photographing start wait state B) (S18), the state transits to the idle state (A) without starting moving image photographing.

The moving image photographing state (C) receives the SW2-on event (S19) and a turbo button depression event (S24). Upon reception of the SW2-on event from the key driver 100 in the moving image photographing state (C) (S19), the capture controller 104 is instructed to stop moving image capture (S20). If the moving image capture is stopped completely, the state transits to the stream producing completion wait state (D).

The stream producing completion wait state (D) receives only a stream producing stop event (S21). Upon reception of the stream producing completion event from the stream producing task 108 in the stream producing completion wait state (D) (S21), a buffer flash instruction event is transmitted to the stream writing task 110 (S22), and a stream writing task end event is transmitted to the stream writing task 110 (S23). The moving image photographing sequence task transits to the idle state (A) to terminate a series of moving image photographing sequences.

Upon reception of the turbo button depression event in the moving image photographing state (C) (S24), the current frame number is acquired and set to a variable Cur_Frame (S25). In this embodiment, each frame of moving image data to be recorded is recorded by adding frame number information representative of the number of frames captured from the photographing start.

A value in the variable Cur_Frame is set to a variable Fast_fps_begin (S26). A sum of the variable Cur-Frame and a variable nFrameGastPeriod is set to the variable Fast_fps_end (S27). After the above processes are completed, the state transits to the moving image photographing state (C).

A value of the variable nFrameFastPeriod is a product of a variable CaptureFPS and a variable FastPeriod. The variable Capture FPS represents the number of frames per second during capture, and the variable. FastPeriod is a recording time (second) at the high speed frame rate. For example, if moving image data output from the capture controller 104 is 90 frames per second and moving image data is recorded at the high speed frame rate for two seconds, then the variable nFrameFastPeriod is 90×2=180.

Stream Producing Task

Figure 11:
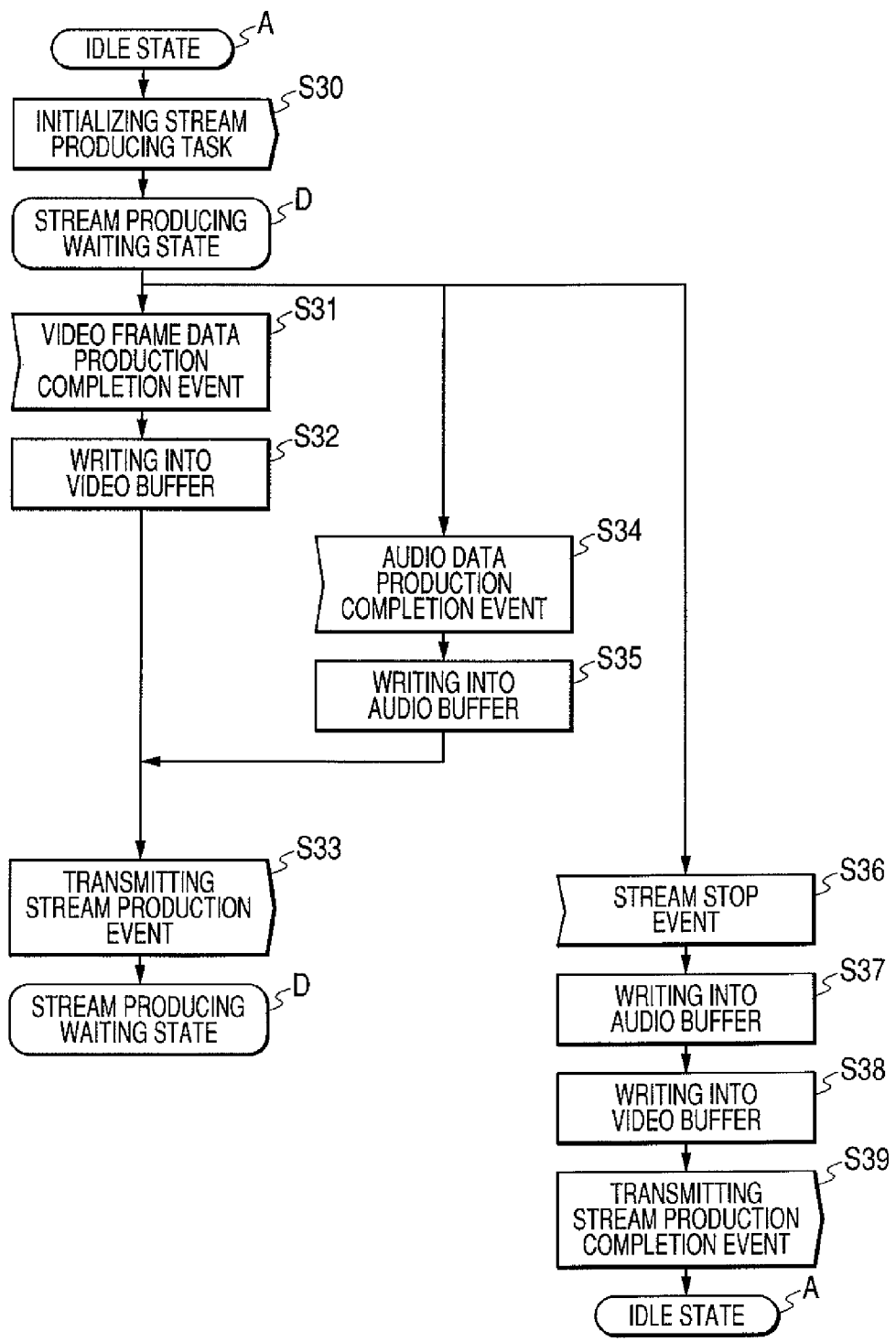
FIG. 11 is a flow chart illustrating a stream generation task.

FIG. 11 is a flow chart illustrating the operation of the stream producing task. The stream producing task 108 has two states: an idle state (A) and a stream producing wait state (B).

In the idle state (A), the stream producing task initializing event is received from the moving image photographing sequence task 102 (S30). Upon reception of the moving image photographing sequence task 102 (S30), the state transits to the stream producing wait state (D).

The stream producing wait state (D) receives a video frame data producing completion event (S31), an audio data producing completion event (S32) and a stream stop event (S33). The video frame data producing completion event (S31) is issued by the capture controller 104 each time video frame data of one frame is produced. The audio data producing completion event is issued by the capture controller 104 each time audio Wave data of a predetermined unit time is produced.

Upon reception of the video frame data producing completion event in the stream producing wait state (D) (S31), a write process to the video buffer is executed (S32). A stream producing event is transmitted to the stream writing task 110 (S33) to thereafter transit to the stream producing wait state (D).

Upon reception of the audio data producing completion event in the stream producing wait state (D) (S34), a write process to the audio buffer is executed (S35). A stream producing event is transmitted to the stream writing task 110 (S33) to thereafter transit to the stream producing wait state (D).

Upon reception of the stream stop event in the stream producing wait state (D) (S36), a write process to the audio buffer (S37) and a write process to the video buffer (S38) are executed. Thereafter, a stream producing end event transmitted to the stream writing task 110 (S39) to thereafter transit to the idle state (A).

Data transfer to the video buffer and audio buffer is, realized by DMA transfer from the capture controller 104. In the write process to the video buffer (S32, S38) and the write process to the audio buffer (S34, S37), a process of managing attribute information of DMA transferred real data is also executed. FIG. 12 shows an example of the attribute information of each frame to be stored in the video buffer.

Stream Writing Task

Figure 13:
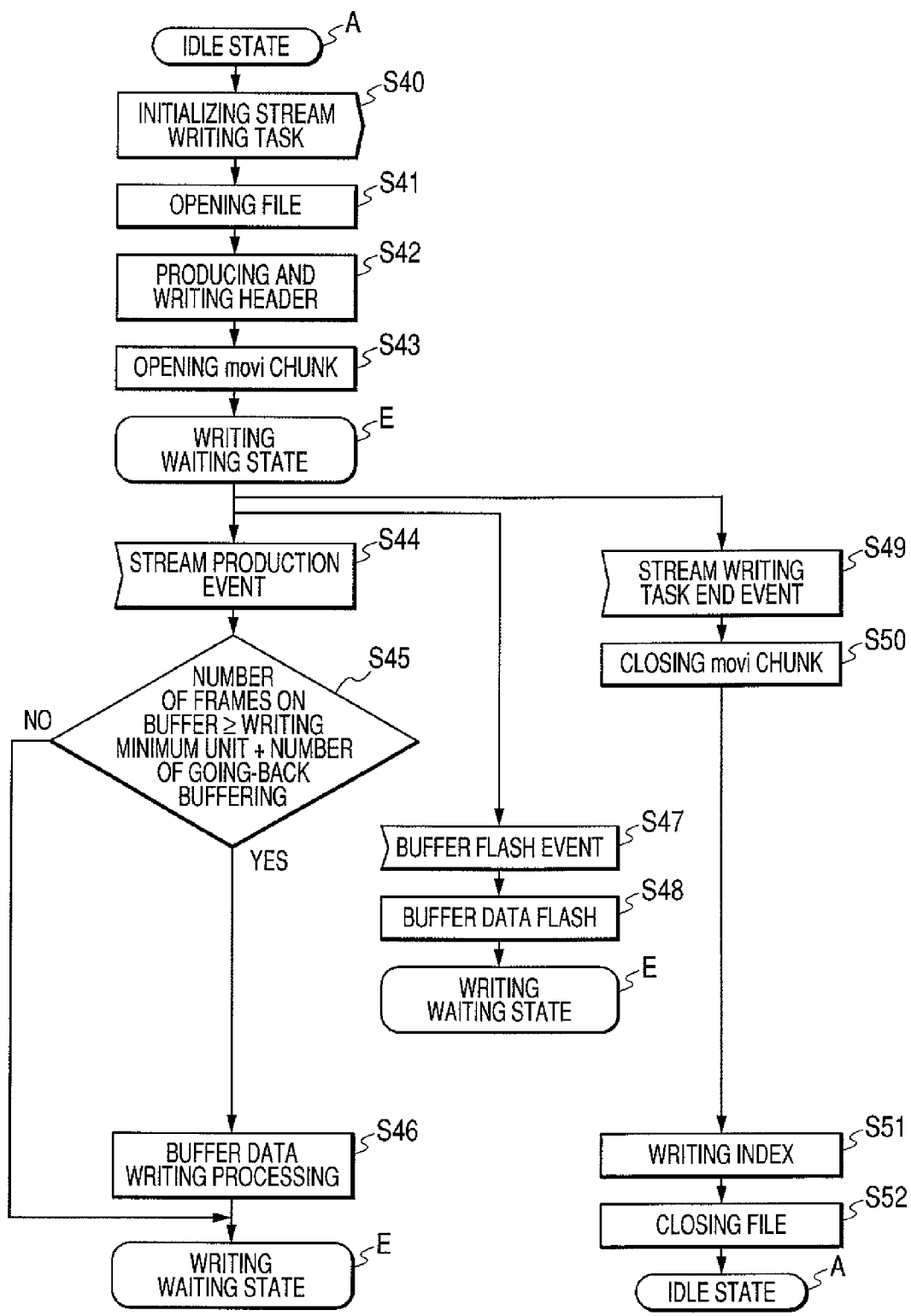
FIG. 13 is a status transition diagram of a stream write task.

FIG. 13 is a flow chart illustrating the operation of the stream writing task. The stream writing task 110 has two states: an idle state (A) and a writing waiting state (E).

In the idle state (A), a stream writing task initialization even is received from the moving image photographing sequence task 102 (S40). Upon reception of the stream writing task initialization event (S40), an AVI file to be newly produced is opened in the file system 112 (S41). As the new file is opened, a header of the AVI file is produced and written in the file (S42). After a chunk header is written, a movi chunk corresponding to the moving image portion is opened (S43). As the movi chunk is opened, the state transits to the writing waiting state (E).

The writing waiting state (E) receives a stream producing event (S44) from the stream producing task 108, a buffer flash instruction event (S47) and a stream writing task completion event (S49) from the moving image photographing sequence task 102.

Upon reception of the stream producing event in the writing waiting state (E) (S44), the number of video frames remained in the video buffer is acquired and compared with a sum of a writing minimum unit (frame number) and the number of going-back buffering frames (S45). The writing minimum unit is the minimum number of frames written in the file system at a time, and is predefined in order to efficiently write streaming data in the file system 112. The writing minimum unit is 90 (=1 (sec)×90 (frames)). The number of going-back buffering frames is the number of frames going back by several seconds by delaying the high speed frame rate period. Assuming that the going-back period is 4 seconds and the high speed frame rate is 90 frames/sec, the number of going-back buffering frames is 360 (=4 (sec)×90 (frames)).

The number of going-back buffering frames may be zero if recording is performed at a frame rate faster than a predetermined frame rate after the turbo button is depressed during moving image recording at the predetermined frame rate. A predetermined value corresponding to the going-back time is set to the number of going-back buffering frames, if the turbo button is depressed and recording is performed at the high speed frame rate at a time before a predetermined time from when the turbo button is depressed.

If the number of video frames on the video buffer is equal to or larger than a sum of a writing minimum unit number) and the number of going-back buffering frames (S45), the number of frames on the buffer 106 subtracted by the number of going-back buffering frames is set as a writing designation frame number, and a buffer data writing processing is executed (S46). After the buffer data writing processing is completed (S46), the state transits to the writing waiting state (E). If the number of video frames in the video buffer is smaller than a sum of a writing minimum unit number) and the number of going-back buffering frames (S45), the writing processing is not executed and the state transits to the writing waiting state (E).

Upon reception of the buffer flash instruction event from the moving image photographing sequence task 102 in the writing waiting state (E) (S47), a buffer data flashing processing is executed (S48). As the buffer data flashing processing is completed (S48), the state transits to the writing waiting state (E).

Upon reception of a stream writing task completion event from the moving image photographing sequence task 102 in the writing waiting state (E) (S49), a chunk size of the movi chunk corresponding to the moving image portion of the AVI file is written and the chunk is closed (S50). An index writing processing is executed for writing indices idxl and idxS (S51). File handle of the AVI file opened at the step S41 is closed (S52). After these processes are completed, the state transits to the idle state (A) to complete a series of writing processes for a moving image stream file.

Buffer Data Writing Processing

Figure 14:
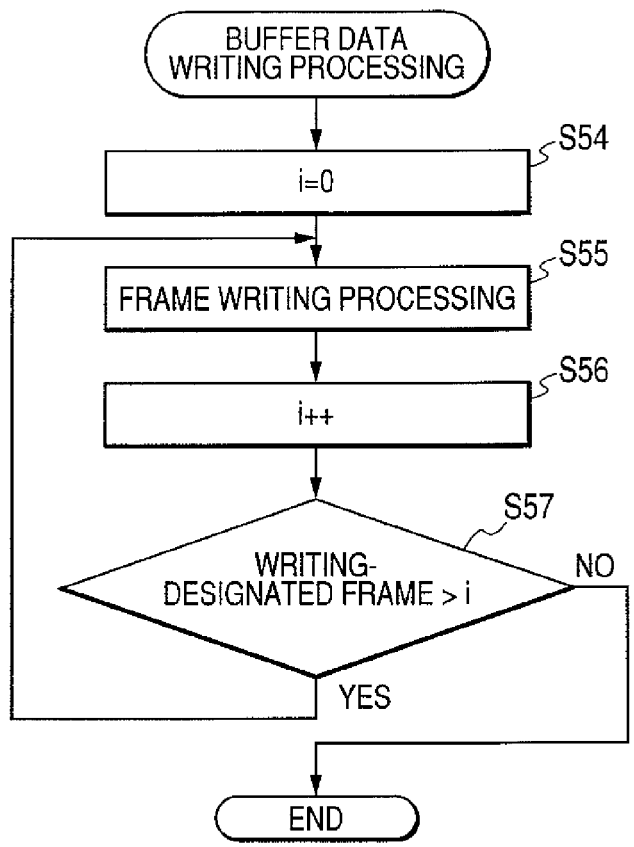
FIG. 14 is a flow chart illustrating a buffer data write process.

FIG. 14 is a flow chart illustrating the details of the buffer data writing processing (S46). When called, the buffer data writing processing first clears a loop counter i to zero (S54). A frame writing processing is executed (S55), and a loop counter i is incremented (S56). The details of the frame writing processing will be later described. It is judged whether the writing-designated frame number exceeds the loop counter i (S57). The writing-designated frame number is passed as an argument when the buffer data writing designation processing is called. The frame writing process is repeated (S55) while the loop counter is smaller then the writing-designated frame number (S57). As the loop counter i becomes equal to or larger than the writing-designated frame number (S57), the buffer data writing processing is terminated.

Buffer Data Flashing Processing

Figure 15:
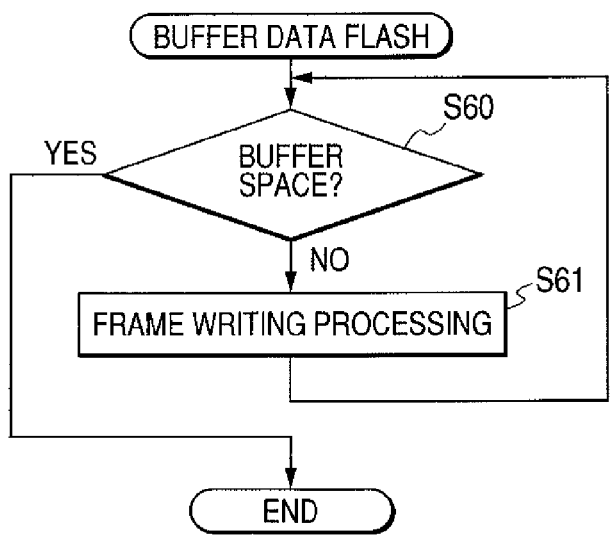
FIG. 15 is a flow chart illustrating a buffer data flash process.

FIG. 15 is a flow chart illustrating the details of the buffer data flashing processing (S48). When called, the buffer data flashing processing checks the number of frames remained in the buffer 106 (S60). If the number of remaining frames is zero (S60), the buffer data flashing processing is terminated. If the number of remaining frames is not zero (S60), the frame writing processing is executed for one frame (S61) to thereafter return to S60. In this manner, all frames remained in the buffer 106 are output one frame after another.

Frame Writing Processing

Figure 16:
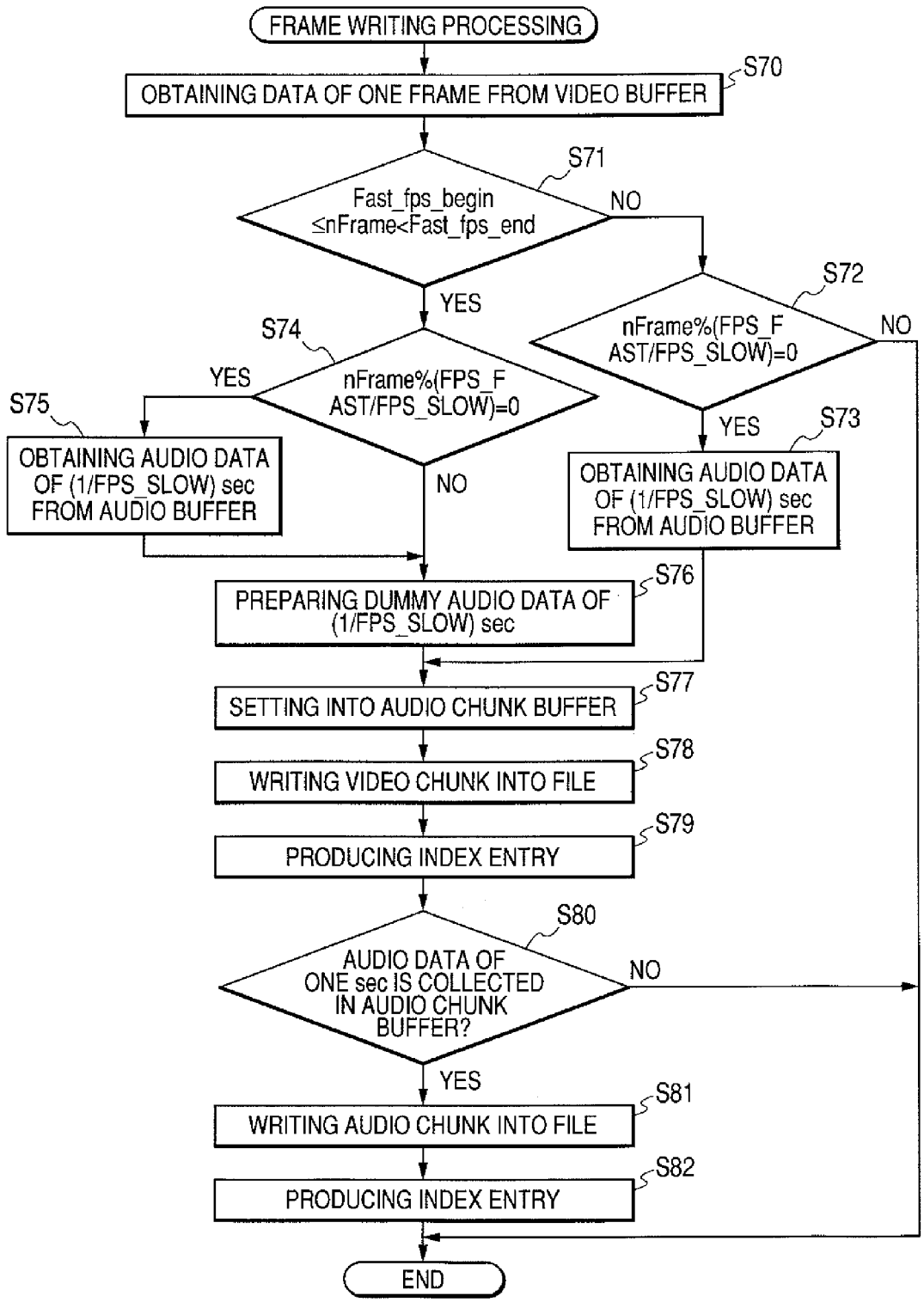
FIG. 16 is a flow chart illustrating a frame write process.

FIG. 16 is a flow chart illustrating the details of the frame writing processing S55, S61. The processing illustrated in FIG. 16 generates moving image data at the low frame rate (n1 frames/sec) and moving image data at the high frame rate (n2 frames/sec).

Data of one frame is acquired from the video buffer formed in the buffer 106 (S70). The frame number nFrame of the acquired frame is compared with Fast_fps_begin and Fast_fps_end, and it is judged whether nFrame is equal to or larger than Fast_fps_begin and smaller than Fast_fps_end (S71). Fast_fps_begin and Fast_fps_end have values set at Steps S26 and S27 when the turbo button depression event is received (S24), in accordance with the frame number at that time.

Namely, the values are set in the manner described above, when a photographer designates moving image data recording at a frame rate higher than the normal frame rate.

If the value of nFrame is equal to or larger than Fast_fps_begin and smaller than Fast_fps_end (S71), it means the recording period of moving images at the high frame rate.

If the value of nFrame is smaller than Fast_fps_begin or equal to or larger than Fast_fps_end (S71), it means the period other than the recording period at the high frame rate, that is, a recording period at the lower (normal) frame rate.

In the case of the recording period at the low frame rate (S71), a remainder is calculated by dividing the frame number nFrame of the acquired data by FPS_FAST/FPS_SLOW, to check whether the remainder is zero (S72). If the remainder is not zero, it is determined that the frame is not required to be recorded, to thereafter terminate the processing for this frame. If the remainder is zero (S72), it is determined that the frame is required to be recorded, and audio data of (1/FPS_SLOW) sec is acquired from the audio buffer (S73).

FPS_FAST indicates the number of frames of moving image data per unit time (generally one second) during the high frame rate recording, and this number is n2. FPS_SLOW indicates the number of frames of moving image data per unit time (generally one second) during the low frame rate recording, and this number is n1.

For example, in this embodiment, FPS_FAST is 90 and FPS-SLOW is 30.

Also in the case of the recording period at the high frame rate (S71), a remainder is calculated by dividing the frame number nFrame of the acquired data by FPS_FAST/FPS_SLOW, to check whether the remainder is zero (S74). If the remainder is not zero (S74), it is determined that the frame is recorded only for recording at the high frame rate, and audio data (e.g., data of silence) of (1/FPS_SLOW) sec is prepared (S76).

If the remainder is zero (S74), it is determined that the frame is required to be recorded bath in recording at the high frame rate and at the low frame rate. The flow advances to Step S75 whereat audio data of (1/FPS_SLOW) sec is acquired from the audio buffer. This audio data is discarded without being set to the audio chunk buffer.

In this manner, it becomes possible to prevent synchronization between moving image data and audio data from being shifted during reproduction of moving image data recorded at the high frame rate.

The dummy audio data prepared at Step S76 or the audio data acquired at Step S73 is set to the audio chunk buffer (S77). In this manner, as the moving image data recorded at the high frame rate is reproduced, the moving image data is reproduced in a slow motion and at the same time audio data of silence is reproduced. As the moving image data recorded at the low frame rate is reproduced, the moving image data and audio image data is reproduced at a normal speed.

Namely, in a reproduction apparatus of the NTSC scheme generally used nowadays, a frame rate of moving image data is 30 frames/sec. Therefore, data recorded at the high frame rate is reproduced in a slow motion. In this embodiment, audio data of silence is recorded as dummy data for high frame rate recording, to thereby prevent sounds from being output as noises during the slow reproduction period.

At S78, the frame data acquired at S70 is written at the position corresponding to the image data C9 shown in FIG. 4 to thereby write the video chunk in the file. Data of an index entry for the video frame data corresponding to the index entry C11 shown in FIG. 4 is generated and written in the index buffer (S79).

It is judged whether audio data of one second is stored (S80). If audio data of one second is stored (S80), the audio data of one second remained in the audio chunk buffer is written at the position corresponding to the audio data C4 shown in FIG. 4 to thereby write the audio chunk in the file (S81). Data of an index entry for the audio data corresponding to the index entry C10 shown in FIG. 4 is generated and written in the index buffer (S82).

Figure 17:
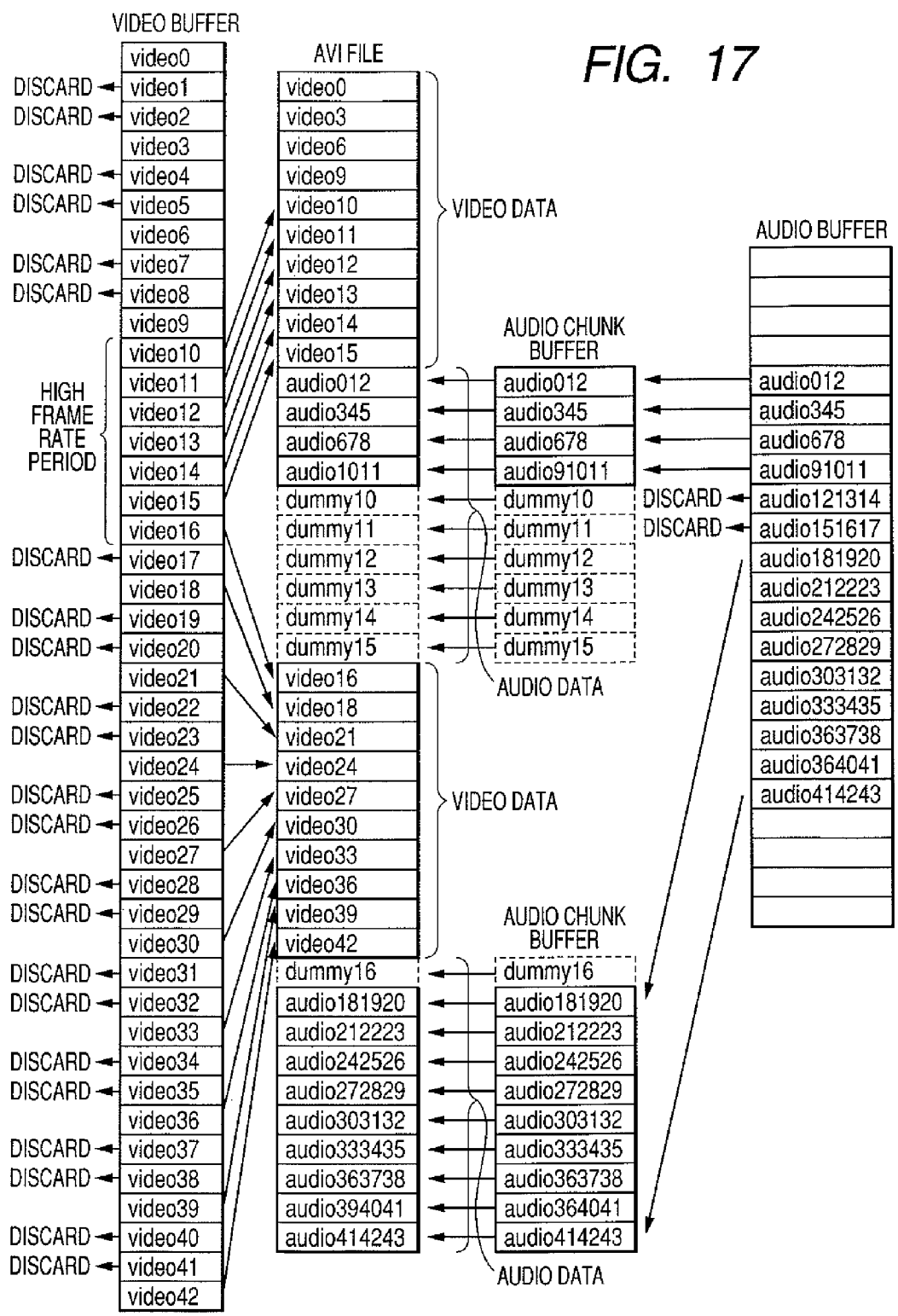
FIG. 17 is a conceptual diagram illustrating data transfer from a buffer to an AVI file.
Figures 18, 19:
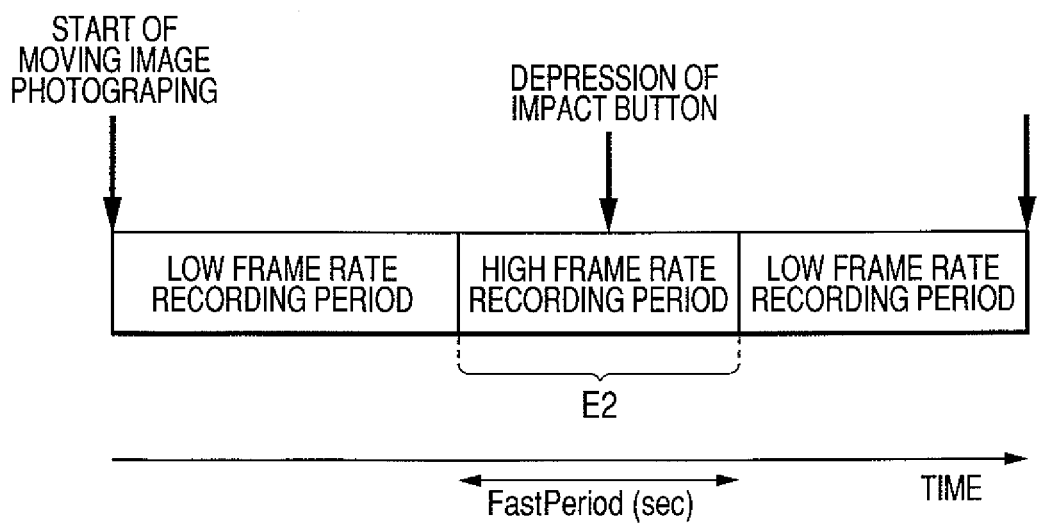
FIG. 18 shows an example of an idx1 index for data transfer shown in FIG. 17.
FIG. 19 is a schematic diagram illustrating a frame rate change in which in response to a high speed frame rate recording instruction, sections before and after the instruction are set to a high speed frame rate recording section.

FIG. 17 is a schematic diagram illustrating data transfer from the video and audio buffers to the AVI file to be executed by the above-described processes, and FIG. 18 shows an example of the structure of an idxl index to be generated.

Moving image data captured at the high frame rate is once loaded in the video buffer. In the example shown in FIG. 17, frames video 10 to video 16 are frames to be recorded at the high frame rate. In the period other than the high frame rate period, two frames per three frames are thinned out and only one frame is recorded.

For example, although frames video 0, video 3, video 6 and video 9 are recorded, frames positioned between these frames are not recorded, including frames video 1, video 2, video 4, video 5, . . . . With this thinning, index entries of left frames are held in the idxl index buffer as shown in FIG. 18. The frames video 10 to video 18 during the high frame rate period are all recorded.

Audio data is stored in the audio buffer when necessary. Audio data having the size of the audio chunk of the AVI file is read from the audio buffer and read to the audio chunk buffer when necessary to thereby write the audio data in the audio chunk of the AVI file. During the high frame rate period, dummy audio data dummy 10 to dummy 16 is stored in the AVI file.

In FIG. 8, the predetermined period after the first predetermined operation (turbo button depression) is used as the high frame rate recording period. However, as shown in FIG. 19, the high frame rate recording period may be a predetermined period having a time of a second predetermined operation (impact button depression) as a center on a time axis. For example, the high frame rate recording period is the total of FastPeriod/2 sec before the impact button is depressed and FastPeriod/2 sec after the impact button is depressed.

Figure 20:
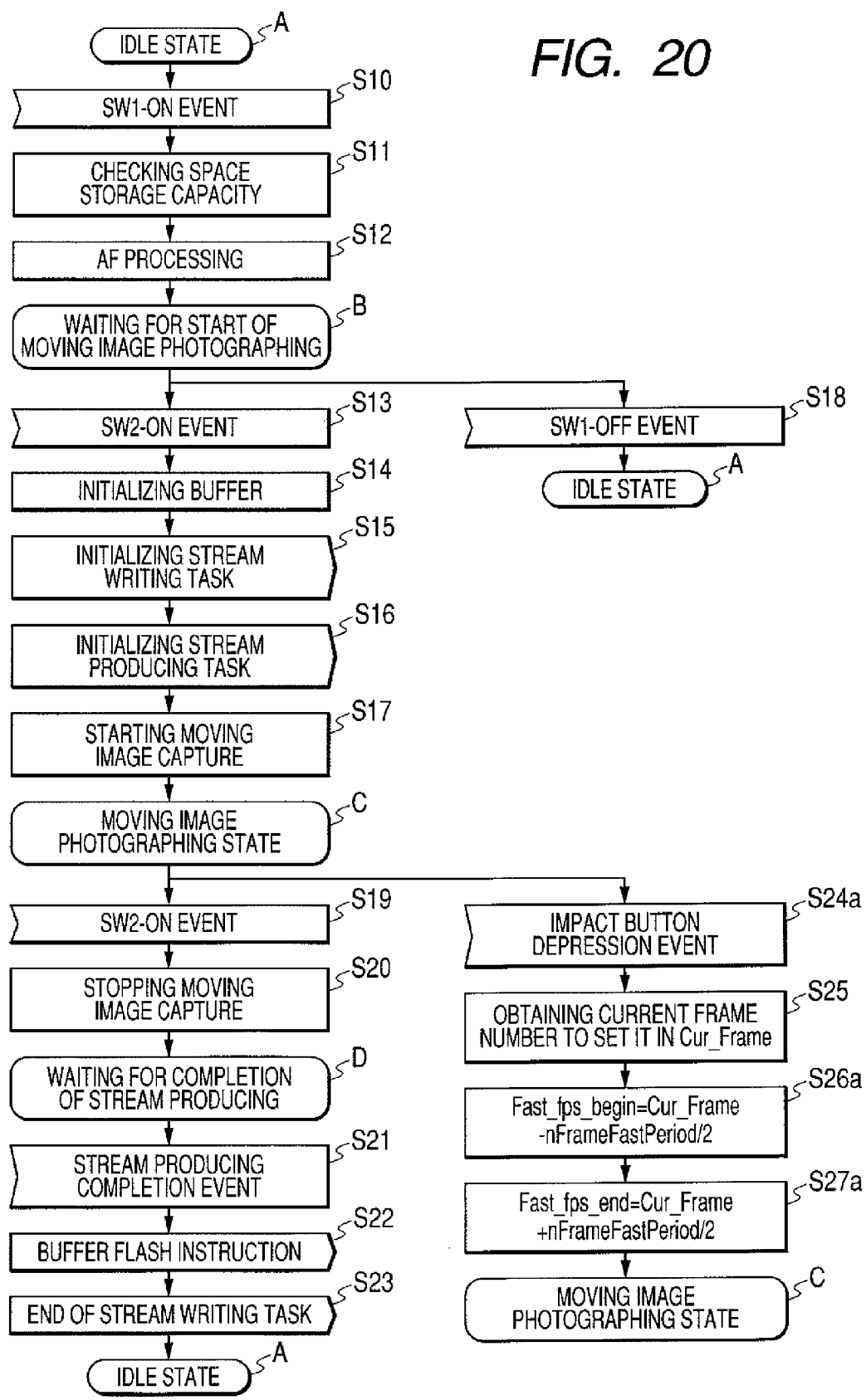
FIG. 20 is a flow chart illustrating a photographing video sequence task illustrated in FIG. 19.

FIG. 20 is a flow chart illustrating the photographing video sequence task in this case. In FIG. 20, a main portion is the same as that of the photographing video sequence task shown in FIG. 10, and the changed portion is indicated by adding symbol a.

Namely, a depression event of the impact button instead of the turbo button is received (S24a). At Step S26a, Cur_Frame−nFrameFastPeriod/2 is set to Fast_fps_begin. At Step S27a, Cur_Frame+nFrameFastPeriod/2 is set to Fast_fps_end. At Step S45 of the stream writing task shown in FIG. 13, it is necessary that the number of going-back buffering frames is set to a value larger than CaptureFPS×FastPeriod/2.

Figure 21:
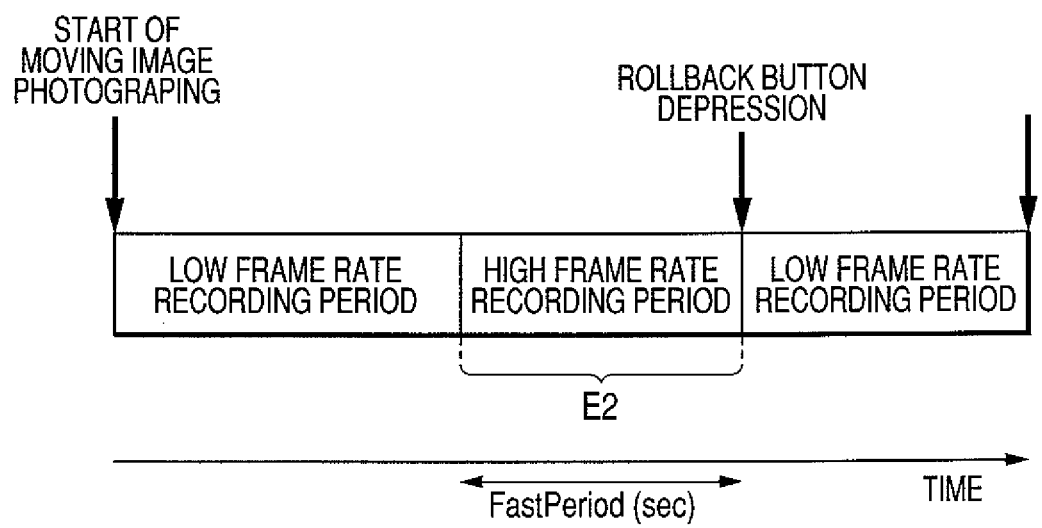
FIG. 21 is a schematic diagram illustrating a frame rate change in which in response to a high speed frame rate recording instruction, a predetermined section immediately before the instruction is set to a high speed frame rate recording section.

Further, as shown in FIG. 21, the high frame rate recording period may be a predetermined period before a third predetermined operation (rollback button depression).

Figure 22:
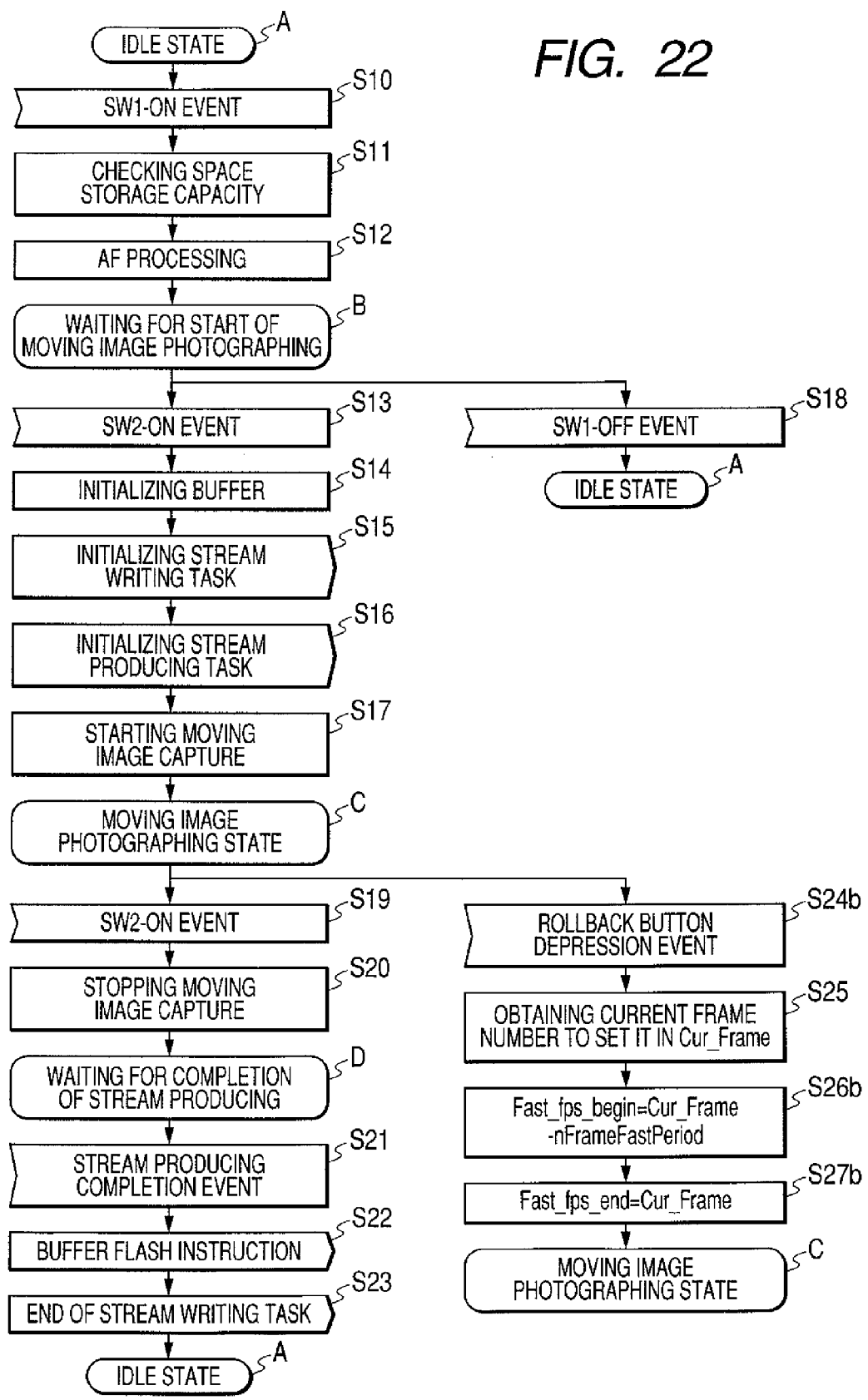
FIG. 22 is a flow chart illustrating a photographing video sequence task illustrated in FIG. 21.

FIG. 22 is a flow chart illustrating the photographing video sequence task it this case. In FIG. 22, a main portion is the same as that of the photographing video sequence task shown in FIG. 10, and the changed portion is indicated by adding a symbol b.

Namely, a depression event of the rollback button instead of the turbo button is received (S24b). At Step S26b, Cur_Frame−nFrameFastPeriod is set to Fast_fps_begin. At Step S27b, Cur_Frame is set to Fast_fps_end. At Step S45 of the stream writing task shown in FIG. 13, it is necessary that the number of going-back buffering frames is set to a value-larger than CaptureFPS×FastPeriod.

The moving image data recording scheme may be a Motion JPEG scheme which compression-encodes each image independently, a MPEG scheme which mutually uses a series of necessary images, or other schema.

In this embodiment, although a detachable memory card is used illustratively as the recording medium 58, an internal memory built in a digital camera may be used as the recording medium 58. An external storage capable of being connected via the communication control apparatus 42 by using a wired or wireless communication protocol may also be used as the storage medium.

In this embodiment, although the predetermined period is set to the high frame rate photographing period, the embodiment is not limited thereto. For example, the high frame rate photographing period may be prolonged or shortened in accordance with the space state of the video buffer. In this case, when the buffer space reduces more than a predetermined amount, the high frame rate recording of moving image data is terminated to switch to the low frame rate recording.

In this embodiment, although silence data is used as the dummy audio data, the dummy audio data may be real time audio data expanded to convert the audio data into slow audio data synchronizing with slow reproduction.

Next, the second embodiment will be described.

Figure 23:
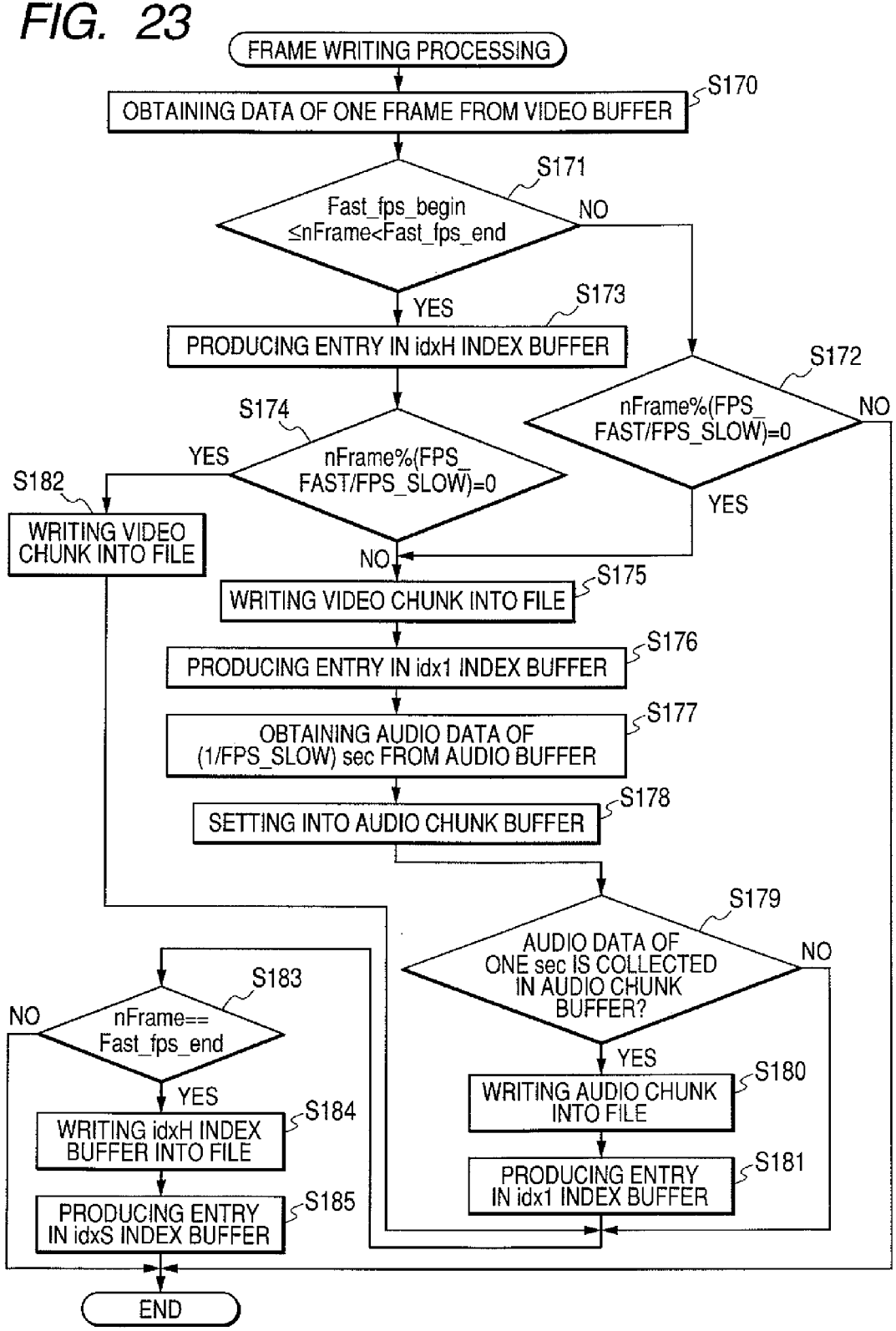
FIG. 23 is a flow chart illustrating another example of the frame writing processing.

FIG. 23 is a flow chart illustrating another example of the details of the frame writing processing S55, S61.

Data of one frame is acquired from the video buffer formed in the buffer 106 (S170). The frame number nFrame of the acquired frame is compared with Fast_fps_begin and Fast_fps_end, and it is judged whether nFrame is equal to or larger than Fast_fps_begin and equal to or smaller than Fast_fps_end (S171).

As described in the first embodiment, Fast_fps_begin and Fast_fps_end have values set at Steps S26 and S27 when the turbo button depression event is received (S24), in accordance with the frame number at that time. Namely, the values are set in the manner described above, when a photographer designates moving image data recording at a frame rate higher than the normal frame rate.

If the value of nFrame is equal to or larger than Fast_fps_begin and equal to or smaller than Fast_fps_end (S171), it means the recording period of moving images at the high frame rate. If the value of nFrame is smaller than Fast_fps_begin or larger than Fast_fps_end, it means the period other than the recording period at the high frame rate, that is, the recording period at the low (normal) frame rate.

In the case of the recording period at the low frame rate (S171), a remainder is calculated by dividing the frame number nFrame of the acquired data by FPS_FAST/FPS_SLOW, to check whether the remainder is zero (S172). If the remainder is not zero (S172), it is decided that the frame is not required to be recorded, to thereafter terminate the processing for this frame. If the remainder is zero (S172), it is decided that the frame is, required to be recorded, and the flow advances to S175.

FPS_FAST and FPS_SLOW are similar to those of the first embodiment. For example, FPS_FAST is 90 and FPS-SLOW is 30.

In the case of the recording period at the high frame rate (S71), i.e., if the value of nFrame is equal to or larger than Fast_fps_begin and equal to or smaller than Fast_fps_end (S171), an index entry is produced in an idxH index buffer for the index of the high frame rate section (S173). A remainder is calculated by dividing the frame number nFrame of the acquired data by FPS_FAST/FPS_SLOW, to check whether the remainder is zero (S174). If the remainder is zero (S174), it is decided that the frame is required to be recorded both in recording at the high frame rate and at the low frame rate, and the flow advances to S182.

If the remainder is not zero (S174), it is decided that the frame recorded only for recording at the high frame rate, and the flow advances to S175.

At S175, the frame data acquired at S170 is written at the position corresponding to the image data C9 shown in FIG. 4 to thereby write the video chunk in the file. Data of an index entry for the video frame data corresponding to the index entry C11 shown in FIG. 4 is generated and written in the idxl index buffer (S176). Audio data of (1/FPS_SLOW, e.g. ⅓₀) sec is acquired from the audio buffer (S177). The acquired audio data is set to the audio chunk buffer (S178).

It is judged whether audio data of one second is stored (S179). If audio data of one second or more is stored (S179), the audio data of one second remained in the audio chunk buffer is written at the position corresponding to the audio data C4 shown in FIG. 4 to thereby write the audio chunk in the file (S180). Data of an index entry for the audio data corresponding to the index entry C10 of the idxl index shown in FIG. 4 is generated and written in the idxl index buffer (S181). If the audio data of one second or more is not stored (S179), Steps S180 and S181 are skipped.

It is judged whether the values of nFrame and Fast_fps_end are the same (S183). If the values of nFrame and Fast_fps_end are the same (S183), it is decided that the high frame rate photographing section is completed, and the contents of the idxH index buffer are written at the position at the file position corresponding to the idxH index D6, D7 (S184). An entry is formed in the idxS index buffer for the idxH index (S185).

The frame writing processing is completed by the above-described series of processes.

Figure 24:
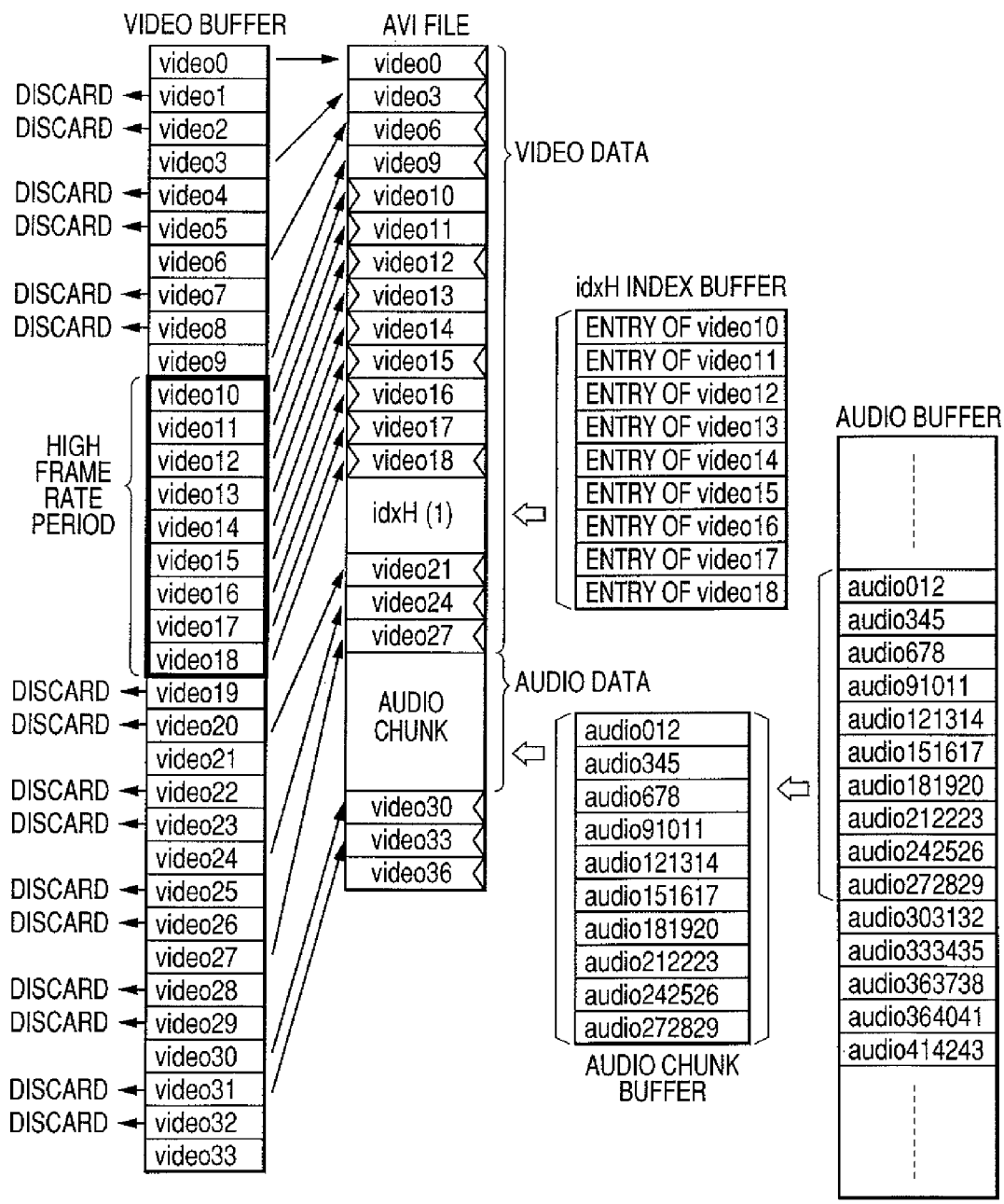
FIG. 24 shows an example of data transfer from buffer to an AVI file for the frame writing processing illustrated in FIG. 23.
Figure 25:
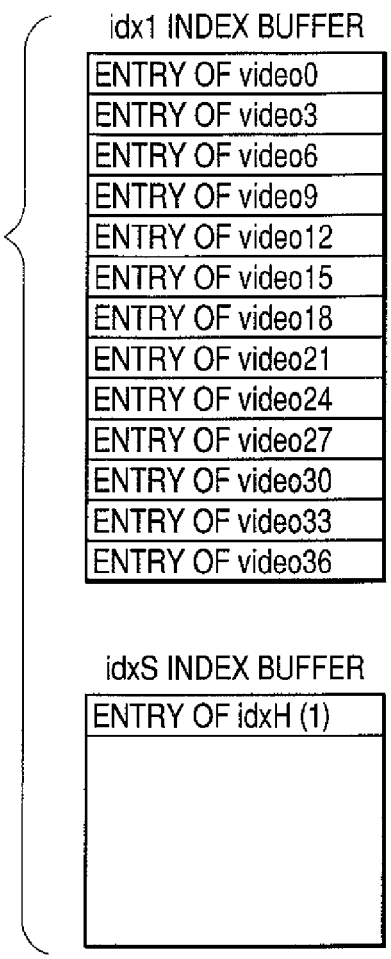
FIG. 25 shows an example of an index for the data transfer illustrated in FIG. 24.

FIG. 24 is a schematic diagram illustrating data transfer from the video and audio buffers to the AVI file to be executed by the above-described processes, and FIG. 25 shows an example of the structure of an idxl index to be generated.

Moving image data captured at the high frame rate is once loaded in the video buffer. In the example shown in FIG. 24, frames video 10 to video 16 are frames to be recorded at the high frame rate. In the period other than the high frame rate period, two frames per three frames are thinned out and only one frame is recorded. For example, although frames video 0, video 3, video 6 and video 9 are recorded, frames positioned between these frames are not recorded, including frames video 1, video 2, video 4, video 5, . . . .

With this thinning, index entries of left frames are held in the idxl index buffer as shown in FIG. 25. The frames video 10 to video 18 during the high frame rate period are all recorded.

The index entries of the frames video 10 to video 18 in one high frame rate period are held in the idxH index buffer. After the recording for the high frame rate section is completed, the contents of the idxH index buffer are recorded as the idxH indices at the file position immediately after the AVI file. An entry of idxH is held in the idxS index buffer.

Index Writing Processing

Figure 26:
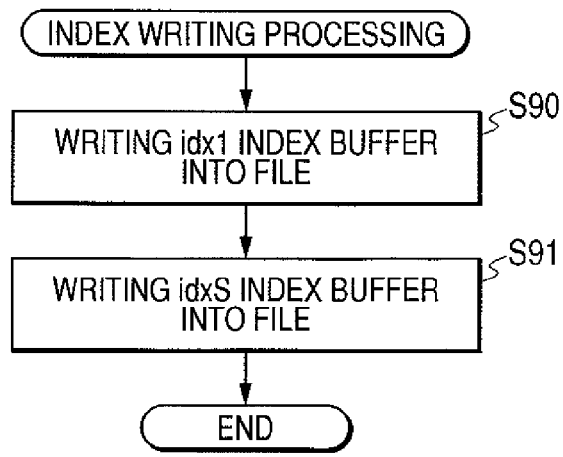
FIG. 26 is a flow chart illustrating an index writing processing.

FIG. 26 is a flow chart illustrating the index writing processing. Data in the idxl index buffer is written in the file (S90). Data in the idxS index buffer is written in the file (S91). Index data of idxl and idxH is written at positions corresponding to D7 and D8 of the file shown in FIG. 5.

Display During Reproduction

Figure 27:
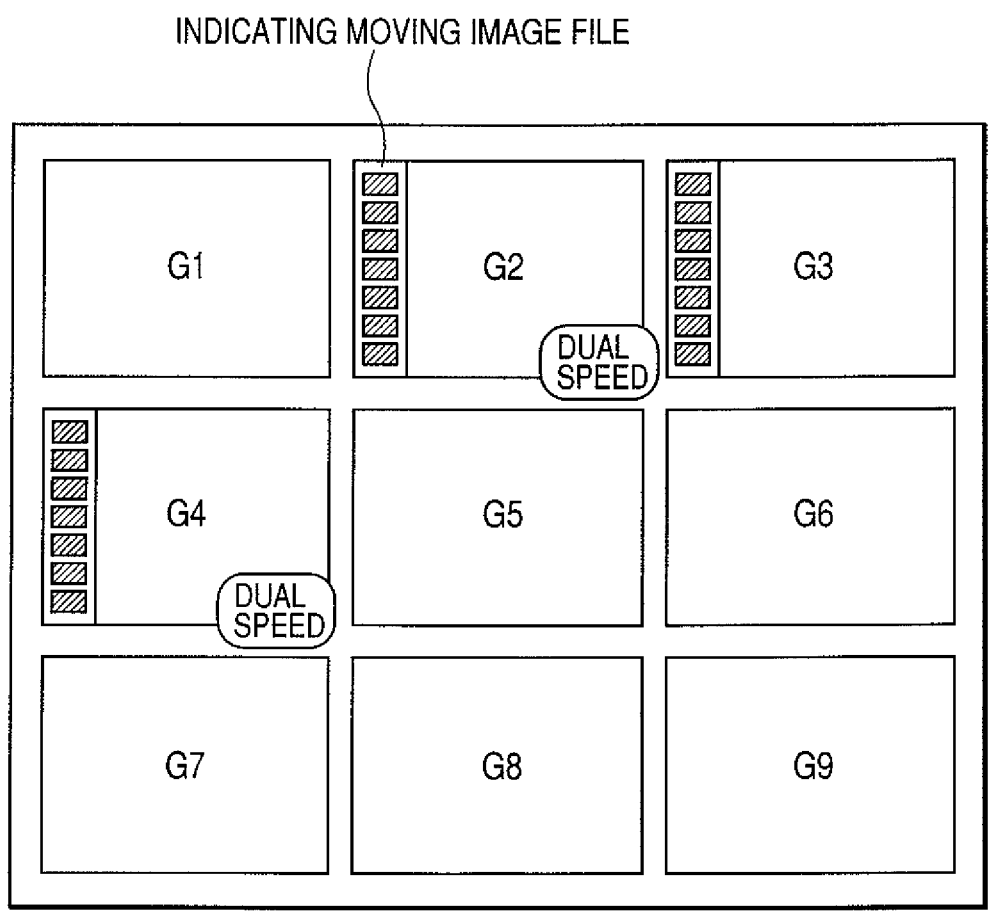
FIG. 27 is a list display screen in a reproduction mode.

FIG. 27 is a list display when a reproduction mode is activated.

Figure 28:
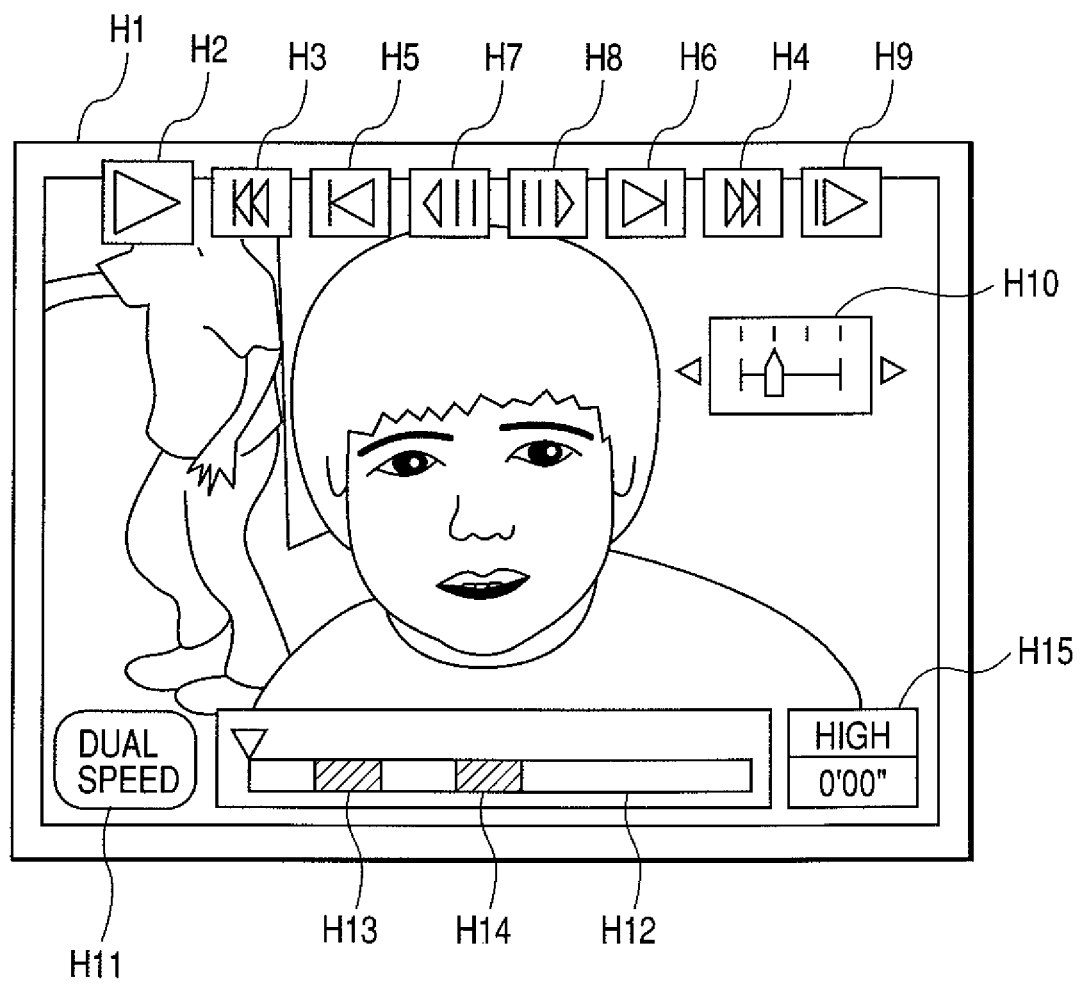
FIG. 28 shows an example of a reproduction screen of a moving image file.

FIG. 28 shows an example of a reproduction screen. In FIG. 27, thumbnail images of nine image objects G1 to G9 are displayed. Perforation marks displayed on the left of the thumbnail images of the objects G2 to G4 indicate that these objects are moving image files. "Dual Speed" icons are added to the thumbnail images of the objects G2 and G3, indicating that the objects are recorded at a plurality of frame rates.

In the state that the screen shown in FIG. 27 is displayed, a user selects a desired object with a four-way operative key (not shown) or the like to instruct reproduction. For example, as the object G2 or G4 is selected and an enter key (not shown) is depressed, the reproduction screen of the object G2 or G4 is displayed as shown in FIG. 28.

Various operation buttons H2 to H10 and icons H11 to H15 for displaying information are displayed on the reproduction screen H1 by GUI (Graphical User Interface).

The operation buttons H2 to H10 are selected with a cross key or the like. As a reproduction button H2 is depressed in a halt state, moving image reproduction starts. Jump buttons H3 and H4 instruct a jump to the start and end of a file, respectively. High speed jump buttons H5 and H6 instruct a jump to one of a plurality of high speed frame rate sections in the moving image file. Frame feed buttons. H7 and H8 instruct forward and backward frame feeding. A slow reproduction button H9 instructs a slow reproduction of moving images. A reproduction speed selection button H10 is used for selecting a slow reproduction speed, in the slow reproduction state entered upon depression of the slow reproduction button H9. Namely, the reproduction speed selection button H10 instructs an increase/decrease in a slow reproduction speed by selecting the four-way operative key right and left during slow reproduction.

A dual speed icon H11 indicates that a moving image file under-reproduction includes a plurality of frame rate sections. A progress bar H12 displays a present moving image reproduction position. Hatched portions of the progress bar H12 are high speed frame rate sections H13 and H14. Namely, a start frame and the number of frames in the high frame rate section can be acquired by referring to the values of StartFrame and nFrame of each entry of SUPER_INDEXENTRY (refer to FIG. 6) stored in idxS. In accordance with this information, relative positions of the high frame rate sections H13 and H14 in all moving image frames of the file can be obtained.

The start position of each of the high frame rate sections H13 and H14 can be determined by acquiring an address of the start frame of an idxH index representative of the high frame rate section by referring to the address value of each entry of SUPER_INDEXENTRY stored in idxS.

In this manner, the high frame rate section can be selected and reproduced easily, by reducing a search work amount. Since the high frame rate sections H13 and H14 are provided, a user can view the timings when the frame rate is changed, and can easily select the high frame rate recording period.

In the above embodiments, although moving image data is recorded at the first and second frame rates, three or more frame rates may be used for recording moving image data.

The aspect of the present invention can also be achieved by providing a storage medium storing program codes for performing the aforesaid processes to a recording apparatus, reading the program codes, by a CPU or MPU of the recording apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the recording apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the recording apparatus or in a memory provided in a function expansion unit which is connected to the recording apparatus, CPU or the like contained in the function expansion card or unit performs a part of entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2005-176872 filed Jun. 16, 2005, which is hereby incorporated by reference herein.

What is claimed is:

1. A reproducing apparatus comprising:
    a reproducing unit adapted to reproduce, from a recording medium, a plurality of moving image files including a first moving image file which stores (a) moving image data of a first frame rate and (b) moving image data of a second frame rate higher than the first frame rate; and
    a display control unit adapted to display, on a display apparatus, predetermined information for discriminating a section of the moving image data of the first frame rate and a section of the moving image data of the second frame rate stored in the first moving image file.

2. An apparatus according to claim 1, wherein the display control unit displays, on the display apparatus, information of a recording period of the section of the moving image data of the first frame rate and information of a recording period of the section of the moving image data of the second frame rate, in different display formats respectively.

3. An apparatus according to claim 1, further comprising a reproduction position designating unit adapted to designate a reproduction position of the first moving image file on the basis of the information displayed on the display apparatus by the display control unit.

4. An apparatus according to claim 1, wherein the first moving image file includes index information indicating the section of the moving image data of the second frame rate.

5. An apparatus according to claim 1, wherein the display control unit displays, on the display apparatus, information indicating that the first moving image file includes the moving image data of the first frame rate and the moving image data of the second frame rate.

6. An apparatus according to claim 1, wherein the display control unit displays, on the display apparatus, information indicating an instruction to jump to the section of the moving image data of the second frame rate in the first moving image file.

7. An apparatus according to claim 1, wherein the display control unit displays, on the display apparatus, the moving image data of the section of the second frame rate in accordance with a predetermined instruction.

8. An apparatus according to claim 1, further comprising a reproduction speed control unit adapted to change a reproduction speed of a moving image file reproduced by the reproducing unit.

9. An apparatus according to claim 1, wherein the display control unit displays, on the display apparatus, information indicating an instruction to change a reproduction speed of a moving image file reproduced by the reproducing unit.

10. An apparatus according to claim 4, wherein the index information includes information indicating a start frame and the number of frames of the section of the moving image data of the second frame rate.

11. An apparatus according to claim 1, wherein the first moving image file includes audio data corresponding to the section of the first frame rate, and dummy data corresponding to the section of the second frame rate.

12. An apparatus according to claim 11, wherein the dummy data is data representing silence.

13. A reproducing method comprising:
reproducing, from a recording medium, a plurality of moving image files including a first moving image file which stores (a) moving image data of a first frame rate and (b) moving image data of a second frame rate higher than the first frame rate; and
controlling to display, on a display apparatus, predetermined information for discriminating a section of the moving image data of the first frame rate and a section of the moving image data of the second frame rate stored in the first moving image file.

14. A method according to claim 13, wherein the display control step includes displaying, on the display apparatus, information of a recording period of the section of the moving image data of the first frame rate and information of a recording period of the section of the moving image data of the second frame rate in different display formats respectively.

15. A method according to claim 13, further comprising designating a reproduction position of the first moving image file on the basis of the information displayed on the display apparatus in the display control step.

16. A method according to claim 13, wherein the display control step includes displaying, on the display apparatus, information indicating that the first moving image file includes the moving image data of the first frame rate and the moving image data of the second frame rate.

17. A method according to claim 13, wherein the display control step includes displaying, on the display apparatus, information indicating an instruction to jump to the section of the moving image data of the second frame rate in the first moving image file.

18. A non-transitory computer-readable storage medium storing a program comprising code for causing a computer to function as an apparatus according to claim 1.

19. A non-transitory computer-readable storage medium storing a program comprising code for causing a computer to function as an apparatus according to claim 2.

20. A non-transitory computer-readable storage medium storing a program comprising code for causing a computer to function as an apparatus according to claim 3.

21. A non-transitory computer-readable storage medium storing a program comprising code for causing a computer to function as an apparatus according to claim 5.

22. A non-transitory computer-readable storage medium storing a program comprising code for causing a computer to function as an apparatus according to claim 6.

23. A reproducing apparatus comprising:
a reproducing unit adapted to reproduce, from a recording medium, one moving image file which stores (a) moving image data of a first frame rate and (b) moving image data of a second frame rate different from the first frame rate; and
a display control unit adapted to display, on a same screen of a display apparatus, first information for instructing to reproduce the one moving image file, second information for instructing a high speed reproduction of the one moving image file, third information for instructing a slow reproduction of the one moving image file, fourth information for instructing to jump a reproduction position of the one moving image file, fifth information for discriminating a section of the moving image data of the first frame rate and a section of the moving image data of the second frame rate stored in the one moving image file, and moving image data stored in the one moving image file.

24. An apparatus according to claim 23, wherein the reproducing unit changes a reproduction position of the one moving image file in accordance with an operation of the fourth information displayed on the display apparatus.

25. An apparatus according to claim 23, wherein the display control unit displays, on the display apparatus, sixth information indicating that the one moving image file stores the moving image data of the first frame rate and the moving image data of the second frame rate.

26. An apparatus according to claim 23, wherein the reproduction unit changes a reproduction speed of the one moving image file in accordance with an operation of the second information or an operation of the third information displayed on the display apparatus.

27. A reproducing method comprising:
reproducing, from a recording medium, one moving image file which stores (a) moving image data of a first frame rate and (b) moving image data of a second frame rate different from the first frame rate; and
controlling to display, on a same screen of a display apparatus, first information for instructing to reproduce the one moving image file, second information for instructing a high speed reproduction of the one moving image file, third information for instructing a slow reproduction of the one moving image file, fourth information for instructing to jump a reproduction position of the one moving image file, fifth information for discriminating a section of the moving image data of the first frame rate and a section of the moving image data of the second frame rate stored in the one moving image file, and moving image data stored in the one moving image file.

28. A method according to claim 27, wherein the reproducing step includes changing a reproduction position of the one moving image file in accordance with an operation of the fourth information displayed on the display apparatus.

29. A method according to claim 27, wherein the display control step includes displaying, on the display apparatus, sixth information indicating that the one moving image file stores the moving image data of the first frame rate and the moving image data of the second frame rate.

30. A method according to claim 27, wherein the reproducing step includes changing a reproduction speed of the one moving image file in accordance with an operation of the second information or an operation of the third information displayed on the display apparatus.

31. A non-transitory computer-readable storage medium storing a program comprising code for causing a computer to function as an apparatus according to claim 23.

32. A non-transitory computer-readable storage medium storing a program comprising code for causing a computer to function as an apparatus according to claim 24.

33. A non-transitory computer-readable storage medium storing a program comprising code for causing a computer to function as an apparatus according to claim 25.

34. A non-transitory computer-readable storage medium storing a program comprising code for causing a computer to function as an apparatus according to claim 26.

35. An apparatus according to claim 1, wherein the display control unit displays, as the predetermined information, information indicating a section of the moving image data of the second frame rate in a total reproduction section of the first moving image file.

36. An apparatus according to claim 1, wherein the display control unit displays, on a same screen of the display apparatus, the moving image data stored in the first moving image file and the predetermined information.

* * * * *